United States Patent
Tsui et al.

(10) Patent No.: US 9,055,106 B2
(45) Date of Patent: *Jun. 9, 2015

(54) PEER TO PEER SHARING OF FUNCTIONALITY OF MOBILE DEVICES

(71) Applicant: Tuen Solutions Limited Liability Company, Wilmington, DE (US)

(72) Inventors: Chi Ying Tsui, Kowloon (HK); Ross David Murch, Kowloon (HK); Roger Shu Kwan Cheng, Tseung Kwan O (HK); Wai Ho Mow, Kowloon (HK); Vincent Kin Nang Lau, Tseung Kwan O (HK)

(73) Assignee: TUEN SOLUTIONS LIMITED LIABILITY COMPANY, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/683,648

(22) Filed: Nov. 21, 2012

(65) Prior Publication Data
US 2013/0080616 A1 Mar. 28, 2013

Related U.S. Application Data

(63) Continuation of application No. 12/054,841, filed on Mar. 25, 2008, now Pat. No. 8,340,658.

(60) Provisional application No. 60/910,109, filed on Apr. 4, 2007.

(51) Int. Cl.
*H04B 1/38* (2006.01)
*H04M 1/00* (2006.01)
(Continued)

(52) U.S. Cl.
CPC ............... *H04L 67/16* (2013.01); *H02J 7/0055* (2013.01); *H02J 7/025* (2013.01); *H02N 2/18* (2013.01)

(58) Field of Classification Search
CPC .................................................. H04M 1/72527
See application file for complete search history.

(56) References Cited

U.S. PATENT DOCUMENTS 5,446,679 A * 8/1995 Griffin et al. ................. 709/202
5,555,490 A 9/1996 Carroll
(Continued)

OTHER PUBLICATIONS

International Search Report and Written Opinion, dated Aug. 19, 2008, PCT application No. PCT/US08/59036, 10 pages.
(Continued)

*Primary Examiner* — Vladimir Magloire
*Assistant Examiner* — Frank Donado
(74) *Attorney, Agent, or Firm* — Amin, Turocy & Watson, LLP

(57) ABSTRACT

Functionality is shared among mobile devices in a peer to peer manner. A mobile device can include a plurality of functional components that can each perform respective functionality. Examples of the functionalities can include transceiver communications, processing, power, memory, input and output for the mobile device. Further, the mobile device can include a sharing component that enables sharing a particular third party functional component to replace or supplement operation of a corresponding functional component of the mobile device. The third party functional component, for instance, can be made available for sharing by at least one of a disparate mobile device or a stand alone functional component. Moreover, a host component can allow a disparate mobile device to use an available one or more of the plurality of functional components of the mobile device.

20 Claims, 16 Drawing Sheets

(51) Int. Cl.
*H04L 29/08* (2006.01)
*H02J 7/00* (2006.01)
*H02J 7/02* (2006.01)
*H02N 2/18* (2006.01)

(56) References Cited

U.S. PATENT DOCUMENTS

| | | | |
|---|---|---|---|
| 5,774,338 A | 6/1998 | Wessling, III | |
| 6,466,232 B1 | 10/2002 | Newell et al. | |
| 6,801,140 B2 | 10/2004 | Mantyjarvi et al. | |
| 6,907,264 B1 | 6/2005 | Sterkel | |
| 6,970,444 B2 | 11/2005 | Chwieseni et al. | |
| 7,092,713 B2 * | 8/2006 | Raji | 455/445 |
| 7,146,433 B2 * | 12/2006 | Cromer et al. | 709/239 |
| 7,167,920 B2 | 1/2007 | Traversat et al. | |
| 7,245,725 B1 * | 7/2007 | Beard | 380/270 |
| 7,617,423 B2 | 11/2009 | Patel | |
| 7,711,392 B2 | 5/2010 | Brown et al. | |
| 7,734,287 B2 | 6/2010 | Ying | |
| 7,769,009 B1 | 8/2010 | Katzer et al. | |
| 7,929,680 B2 | 4/2011 | Li | |
| 8,040,835 B2 | 10/2011 | Olson et al. | |
| 8,068,819 B2 * | 11/2011 | Haehnichen et al. | 455/414.1 |
| 2002/0028704 A1 | 3/2002 | Bloomfield et al. | |
| 2002/0123337 A1 | 9/2002 | Dharia et al. | |
| 2004/0088347 A1 | 5/2004 | Yeager et al. | |
| 2004/0203617 A1 * | 10/2004 | Knauerhase et al. | 455/412.1 |
| 2004/0203797 A1 * | 10/2004 | Burr | 455/445 |
| 2005/0129220 A1 * | 6/2005 | Umstetter et al. | 379/356.01 |
| 2005/0136968 A1 | 6/2005 | Nakayama et al. | |
| 2005/0172141 A1 | 8/2005 | Gayde et al. | |
| 2005/0275729 A1 * | 12/2005 | Billerbeck | 348/222.1 |
| 2006/0019704 A1 * | 1/2006 | Kwon et al. | 455/556.1 |
| 2006/0166663 A1 * | 7/2006 | Haehnichen et al. | 455/419 |
| 2006/0294247 A1 | 12/2006 | Hinckley et al. | |
| 2007/0004387 A1 | 1/2007 | Gadamsetty et al. | |
| 2007/0021140 A1 * | 1/2007 | Keyes et al. | 455/522 |
| 2007/0026857 A1 * | 2/2007 | Kotzin | 455/426.1 |
| 2007/0049341 A1 | 3/2007 | Thoresson | |
| 2007/0054662 A1 | 3/2007 | Dillinger et al. | |
| 2007/0072597 A1 * | 3/2007 | Peuziat et al. | 455/418 |
| 2007/0115346 A1 | 5/2007 | Kim et al. | |
| 2007/0146505 A1 * | 6/2007 | Billerbeck | 348/231.6 |
| 2007/0160004 A1 | 7/2007 | Sakhpara | |
| 2007/0197248 A1 | 8/2007 | Reich et al. | |
| 2007/0201659 A1 | 8/2007 | Altberg et al. | |
| 2007/0255785 A1 | 11/2007 | Hayashi et al. | |
| 2007/0270172 A1 | 11/2007 | Kalley et al. | |
| 2007/0293271 A1 * | 12/2007 | Streeter | 455/566 |
| 2008/0032738 A1 * | 2/2008 | Boyer et al. | 455/556.1 |
| 2008/0045201 A1 | 2/2008 | Kies | |
| 2008/0086226 A1 * | 4/2008 | Fein et al. | 700/94 |
| 2008/0089254 A1 * | 4/2008 | Graves et al. | 370/310 |
| 2008/0089299 A1 * | 4/2008 | Lindsley et al. | 370/338 |
| 2008/0182563 A1 | 7/2008 | Wugofski et al. | |
| 2008/0253340 A1 * | 10/2008 | Hirano et al. | 370/338 |
| 2009/0073268 A1 * | 3/2009 | Jung et al. | 348/207.1 |
| 2009/0098867 A1 | 4/2009 | Varanda | |
| 2009/0197584 A1 * | 8/2009 | Snow et al. | 455/418 |
| 2010/0004023 A1 | 1/2010 | Jabri et al. | |

OTHER PUBLICATIONS

International Search Report and Written Opinion, dated Aug. 22, 2008, PCT application No. PCT /US08/59026, 10 pages.
Chinese OA dated Mar. 2, 2011 for Chinese Application No. 200880014758.3, 12 pages.
OA dated Apr. 1, 2011 for U.S. Appl. No. 12/054,841, 45 pages.
OA dated Oct. 19, 2011 for U.S. Appl. No. 12/054,841, 44 pages.
OA dated Feb. 17, 2012 for U.S. Appl. No. 12/054,841, 46 pages.
Notice of Allowance dated Aug. 23, 2012 for U.S. Appl. No. 12/054,841, 81 pages.

* cited by examiner

PEER TO PEER SHARING OF FUNCTIONALITY OF MOBILE DEVICES

CROSS-REFERENCE TO RELATED APPLICATIONS

This application is a continuation of U.S. patent application Ser. No. 12/054,841, filed on Mar. 25, 2008, and entitled "PEER TO PEER SHARING OF FUNCTIONALITY OF MOBILE DEVICES," which claims the benefit of U.S. Provisional Patent application Ser. No. 60/910,109, filed on Apr. 4, 2007, and entitled "ADVANCEMENTS FOR WIRELESS DEVICES AND WIRELESS COMMUNICATIONS." The entireties of the aforementioned applications are herein incorporated by reference.

TECHNICAL FIELD

The subject disclosure relates generally to wireless devices and wireless communications, and more particularly to peer to peer sharing of functionality of mobile devices in a wireless communication system.

BACKGROUND

There are a variety of areas where the development of wireless mobile devices and wireless communications have stagnated due to lack of imagination or limitations on current technology that hold back advancement of these technologies. However, in consideration of present technological trends, a variety of scenarios are believed to be enabled in the future, e.g., near ubiquitous storage, that are today inhibited either by cost, size, or other technological engineering constraints. Accordingly, conventional mobile devices and wireless communications can be inadequate and fall behind the trends that will continue into the future.

Conventional mobile devices, such as cell phones, smart phones, personal digital assistants (PDAs), mobile media players (e.g., MP3 players, portable media player (PMP)), mobile computing devices (e.g., handhelds, laptops) and the like have generally been provided as integrated electronics and circuits of stand alone devices, with each device operating independently of one another based on a set of network services from a network provider. For instance, mobile devices have included power, processing, storage, display, input capabilities (e.g., keypad, touchpad, buttons, still image and/or video camera, microphone, scanning, storage devices, bio-sensing devices fingerprint recognitions, handwriting recognition, interface to other wireless peripherals, etc.), and output capabilities (e.g., sound, display, physical movement, video projector, interface to HDTV, etc.) all in the same handheld device, and thus, historically, there has been no need to share functionality across devices when an integrated set of functionality is already available within a single device.

However, hardware that performs according to these individual functionalities is becoming smaller and more performant, and wireless capabilities (e.g., Bluetooth, Ultra-wideband (UWB), WiMax, Long Term Evolution (LTE), 4G systems) are becoming more powerful as well. Accordingly, in the future, these disparate functions may be separated into multiple components that are communicatively coupled by wired or wireless means. Moreover, even where components are not separated, it would be desirable to be able to utilize one or more functionalities offered by third party mobile devices. For instance, today, when a mobile device becomes disconnected from a network provider for any reason, the user of the mobile device is left with little recourse for continuing to receive voice or data by the mobile device.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

Systems and methodologies for sharing functionality among mobile devices in a peer to peer manner are described herein. A mobile device can include a plurality of functional components that can each perform respective functionality. Examples of the functionalities can include transceiver communications, processing, power, memory, input and output for the mobile device. Further, the mobile device can include a sharing component that enables sharing a particular third party functional component to replace or supplement operation of a corresponding functional component of the mobile device. The third party functional component, for instance, can be made available for sharing by at least one of a disparate mobile device or a stand alone functional component. Moreover, a host component can allow a disparate mobile device to use an available one or more of the plurality of functional components of the mobile device.

Functionality can be shared across mobile devices. Peer to peer sharing can occur automatically to allow a mobile device to borrow accessible resources made available from other mobile devices when needed. Additionally or alternatively, sharing can be effectuate based upon user input (e.g., opt in/opt out). According to another illustration, mobile devices can collectively provide a mesh network of devices, with each device being capable of sharing processing, communication, connectivity, and/or information resources with one another in a peer to peer manner. In accordance with a further example, hybrid processing can be implemented where multiple processors of nearby mobile devices can be shared.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed. The claimed subject matter is intended to include all such aspects and their equivalents. Other advantages and novel features of the claimed subject matter can become apparent from the following detailed description when considered in conjunction with the drawings.

BRIEF DESCRIPTION OF THE DRAWINGS

Various non-limiting embodiments are further described with reference to the accompanying drawings in which.

DETAILED DESCRIPTION

Figure 1:
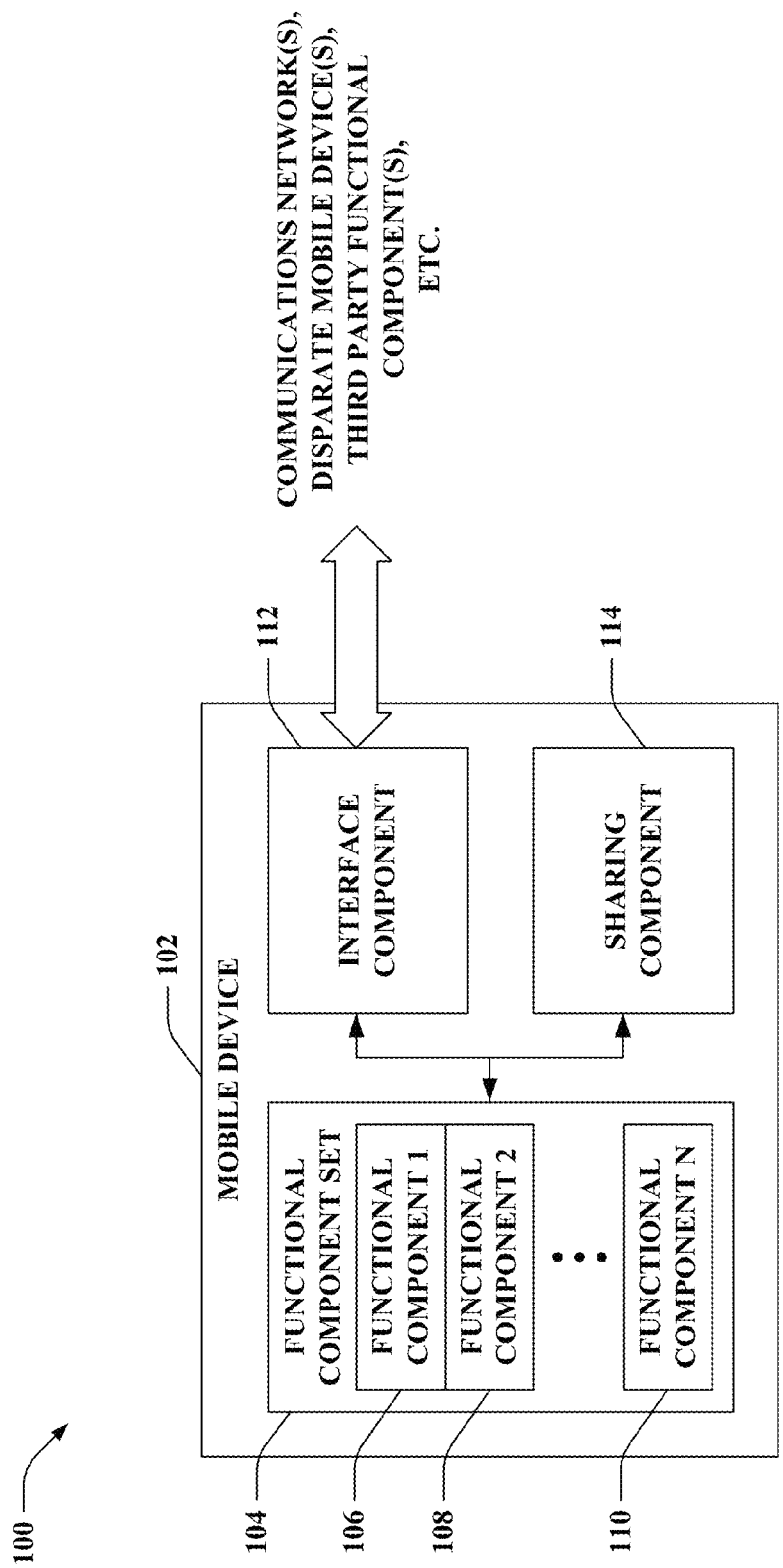
FIG. 1 is an illustration of an example system that shares functional elements in a wireless communication environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "system," "module", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, the methods and apparatus of the claimed subject matter, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the claimed subject matter. The components may communicate via local and/or remote processes such as in accordance with a signal having one or more data packets (e.g., data from one component interacting with another component in a local system, distributed system, and/or across a network such as the Internet with other systems via the signal).

Conventional mobile devices, such as cell phones, smart phones, personal digital assistants (PDAs), mobile media players (e.g., MP3 players, PMP), mobile computing devices (e.g., handhelds, laptops) and the like have generally been provided as integrated electronics and circuits of standalone devices, with each device operating independently of one another based on a set of network services from a network provider. However, hardware that performs according to these individual functionalities is becoming smaller and more performant, and wireless capabilities (e.g., Bluetooth, UWB, WiMax, LTE, 4G systems) are becoming more powerful as well. Accordingly, disparate functions can be separated into multiple components that are communicatively coupled by wired or wireless means. Moreover, even where components are not separated, there are benefits to being able to utilize one or more functionalities offered by third party mobile devices. For instance, today, when a mobile device becomes disconnected from a network provider for any reason, the user of the mobile device is left with little recourse for continuing to receive voice or data by the mobile device.

In consideration of these restraints on sharing of functionality of conventional mobile devices, the claimed subject matter relates to providing sharing of functionality across mobile devices. In an embodiment, where enabled, mobile devices can communicate with one another and transmit information to nearby phones for a variety of purposes. For instance, where a first user of a first mobile device is stranded and cannot connect to a network, the first mobile device can communicate with a second mobile device (e.g., employed by a disparate, second user) that does have connectivity, so that the first user can make a phone call through the second mobile device as an intermediary.

Referring to FIG. 1, illustrated is a system 100 that shares functional elements in a wireless communication environment. The system 100 includes a mobile device 102, which further comprises a functional component set 104 that provide various functionalities for the mobile device 102. The functional component set 104 can include N functional components (e.g., functional component 1 106, functional component 2 108, functional component N 110), where N can be substantially any integer. Each of the functional components 106-110 can perform respective functionality. By way of illustration, functionality provided by each of the functional components 106-110 can respectively relate to transceiver communications, power, processing, memory, input for the mobile device 102, output for the mobile device 102, and so forth. Further, it is contemplated that the functional component set 104 of the mobile device 102 need not be identical to functional component set(s) of disparate mobile device(s). Thus, by way of example, the functional component set 104 of the mobile device 102 can include a functional component (e.g., one of the functional components 106-110) that collects audio signals (e.g., a microphone), while a differing mobile device (not shown) can lack such a functional component that collects audio signals; however, the claimed subject matter is not so limited.

It is to be appreciated that the mobile device 102 (and/or the disparate mobile device(s) (not shown)) can be referred to as a user device, an access terminal, a mobile, a mobile station, a user terminal, a wireless communication device, a remote terminal, and so forth. Further, the mobile device 102 can be a telephone (e.g., cellular, wireless), a personal digital assistant (PDA), a computing device (e.g., laptop, handheld, desktop), a smart phone, a mobile media player (e.g., an MP3 player, PMP), a camera (e.g., still image and/or video camera), or the like. Moreover, it is to be appreciated that one or more of the functional components 106-110 in the functional component set 104 can be associated with receiving and transmitting signals; these functional component(s) 106-110 can include, but are not limited to, processors, memory, modulators, multiplexers, demodulators, demultiplexers, etc.

The mobile device 102 can also include an interface component 112 that receives signals and/or transmits signals to communication network(s) (not shown), disparate mobile device(s) (not shown), third party functional component(s) (e.g., stand alone functional component(s)) (not shown), and so forth. For instance, the interface component 112 can enable the mobile device 102 to initiate a connection with a peer (e.g., disparate mobile device, third party functional component, external storage and peripherals); upon being initiated, the connection can be formed, maintained, utilized to transfer data, and so forth by the interface component 112. According to another illustration, the interface component 112 can facilitate creating a connection with the peer upon the peer initializing such connection; this connection can be maintained and employed thereafter by the interface component 112. Further, the connection between the mobile device 102 and the peer can be automatically initiated (e.g., by the interface component 112) (and thereafter maintained), for example, upon the mobile device 102 and the peer being within proximity of each other, upon a channel condition between the mobile device 102 and the peer being observed (e.g., the channel condition can be signal to noise ratio (SNR) level, signal strength, noise level, frame error rate (FER) level, interference level, etc.), and so forth. Further, the interface component 112 can enable creating, maintaining, and using a connection with the communication network(s). It is contemplated that the interface component 112 can allow for connecting to any type of communication network.

Although the interface component 112 is depicted as being separate from the functional component set 104, it is contemplated that the interface component 112 can be one of the functional components 106-110. Additionally, the interface component 112 can provide various adaptors, connectors, channels, communication paths, etc. to enable receiving and/or transmitting signals. For instance, the interface component 112 can employ wired and/or wireless means to communicatively couple with communication network(s), disparate mobile device(s), third party functional component(s), and so forth. Further, the interface component 112 can couple with interface component(s) associated with the communication network(s), disparate mobile device(s), third party functional component(s), etc.

Moreover, the mobile device 102 can include a sharing component 114 that shares one or more of the functional components 106-110 with disparate mobile device(s), third party functional component(s), etc. coupled to the mobile device 102 via the interface component 112. Additionally or alternatively, the sharing component 114 can replace or supplement functionality provided by the functional component set 104 by leveraging disparate functional component(s) made available for sharing by disparate mobile device(s), third party functional component(s), and so forth coupled to the mobile device 102 via the interface component 112.

If one (or more) of the functional components 106-110 of the mobile device 102 becomes disabled (e.g., functional component 2 108 can become disabled, however any of the functional components 106-110 can be disabled), then the sharing component 114 can replace this disabled functional component 2 108 with a functional component (or more than one functional component) of one or more disparate mobile devices and/or one or more third party functional components. By way of illustration, the disabled functional component 2 108 can be a display. Hence, when this display experiences degraded and/or failed operation, the sharing component 114 can share a differing display (e.g., of a disparate mobile device, a stand alone monitor, video projector, external HDTV) to yield a viewable output. It is to be appreciated, however, that the claimed subject matter is not limited to this example.

According to another example, functionality provided by the functional components 106-110 can be supplemented by the sharing component 114. Where the functional component set 104 includes a display with limited geographic area for rendering viewable output, the sharing component 114 can enable the mobile device 102 to leverage a stand alone monitor or a disparate monitor of a disparate mobile device upon which the viewable output from the mobile device 102 can be rendered. Therefore, it is contemplated that the displayed images can be rendered upon both the display of the mobile device 102, which can be one of the functional components 106-110, and the stand alone monitor (or disparate monitor of the disparate mobile device) (e.g., substantially similar or differing images can be outputted upon the local and remote displays). Alternatively, the mobile device 102 can enable rendering images solely upon the stand alone monitor (or disparate monitor of the disparate mobile device) while foregoing output upon the display (e.g., one of the functional components 106-110) of the mobile device 102. However, the claimed subject matter is not limited to the aforementioned example.

Figure 2:
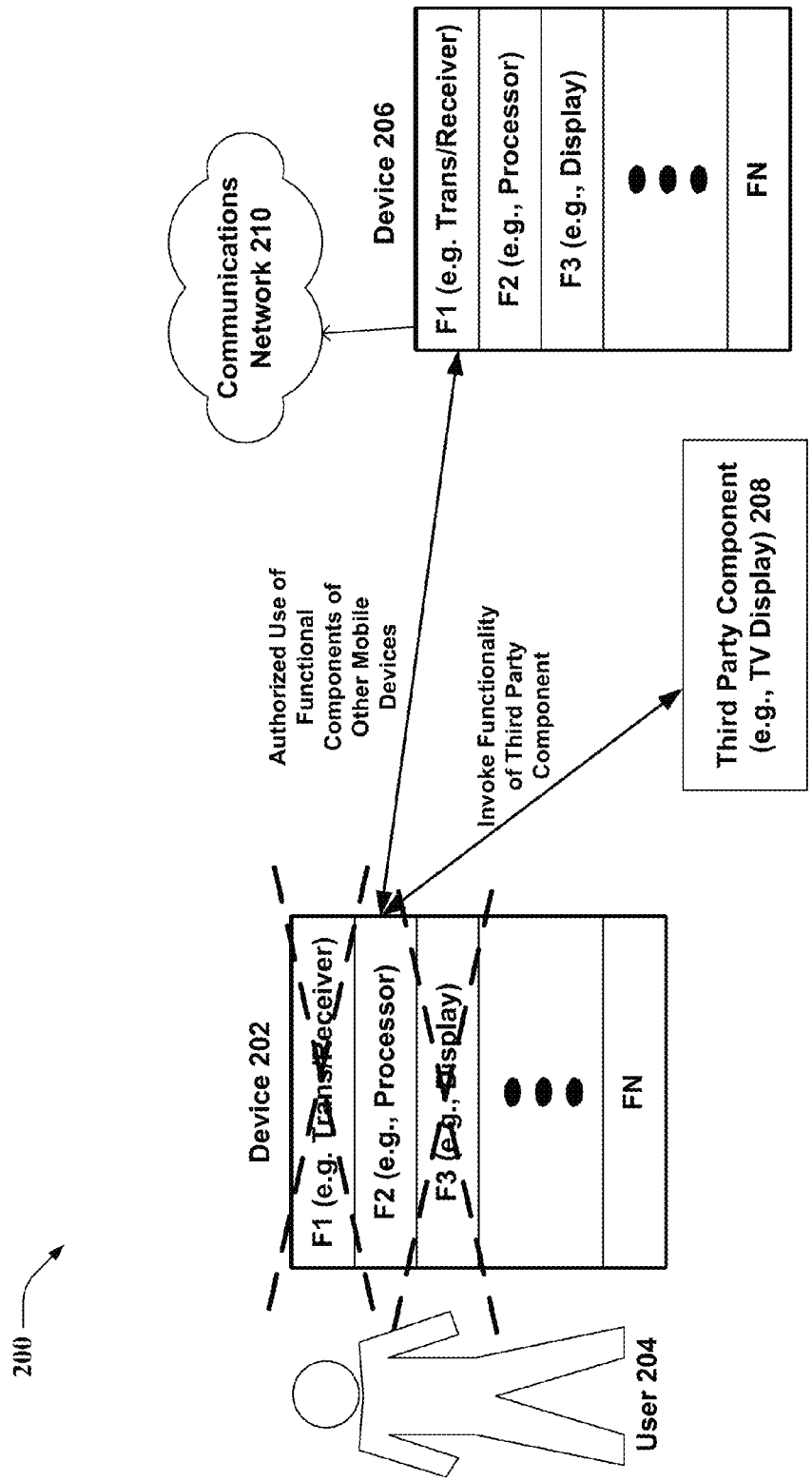
FIG. 2 is an illustration of an example system that depicts sharing of functionality among mobile devices (e.g., peer to peer sharing of functionality)

Turning to FIG. 2, illustrated is a system 200 that depicts sharing of functionality among mobile devices (e.g., peer to peer sharing of functionality). The system 200 includes a device 202 (e.g., mobile device such as the mobile device 102 of FIG. 1, disparate mobile device, external storage and peripherals) that can be employed by a user 204. Further, the system 200 can include a device 206 (e.g., mobile device such as the mobile device 102 of FIG. 1, disparate mobile device, external storage and peripherals) and/or a third party component 208 (e.g., third party functional component, a television display, video projector, external HDTV). Although not shown, it is to be appreciated that any number of additional devices and/or third party components can also be included in the system 200. Further, the system 200 can include a communications network 210; it is to be appreciated that the device 202, the device 206, the third party component 208, any disparate device(s), and/or any disparate third party component(s) can connect to the communications network 210 (although only the device 206 is illustrated to be connected to the communications network 210). Moreover, more than one communications network, each of which can be similar to the communications network 210, can be included in the system 200 (although not depicted).

Each of the devices 202 and 206 can be thought of as a set of cooperating functional elements F1, F2, F3, to FN (e.g., functional component 1 106, . . . , functional component N 110 of FIG. 1), where N can be substantially any integer. There need not be an identical function set (e.g., functional component set such as functional component set 104 of FIG. 1) across devices 202 and 206 (and/or any disparate devices (not shown)). However, in general, each device 202 and 206 can have an input component, output component (e.g., display), processor, transceiver, and the like.

The following example is provided to illustrate operation of the system 200, yet it is to be appreciated that the claimed subject matter is not limited to this example. Where the user 204 has lost use of F1 (e.g., the transceiver) of the device 202 for connecting to the communications network 210, in a peer to peer fashion, the user 204 of the device 202 can still connect to the communication network 210 through the function F1 of the device 206. Thus, the device 202 can borrow the needed resource from the device 206 (e.g., the device 206 can share the function F1). The device 206 can be aware or unaware of the use of the resource by the device 202. Generally, a user of the device 206 can be aware of the use, and in an embodiment, use of any of the functional components of the device 206 can require authorization. For instance, the user of the device 206 and/or the device 206 itself can authorize use of the functional elements by any disparate device in a group including the device 202. Additionally or alternatively, authorization of the device 202 in particular, rather than a group of devices, can be analyzed by the device 206.

According to another illustration, as shown, the device 202 (e.g., the user 204 of the device 202) is additionally or alternatively able to use the third party component 208. For instance, the third party component 208 can be a display resource provided by a third party (e.g., a television display); however, it is contemplated that the third party component 208 can be any type of resource such as, but not limited to, an input device (e.g., microphone, camera, video camera, scanner, keyboard, mouse, button, scanner, touch screen, sensor, bio sensing devices, handwriting recognition device, fingerprint recognition, external input peripherals, . . . ), an output device (e.g., display, speaker, printer, video projector, HDTV, external storage), a processor, memory, networking device (e.g., router, switch, hub, gateway), a power supply, a combination thereof, and so forth. Where the third party component 208 is a television display, a display (e.g., F3) of the device 202 can be somewhat limited (e.g., in size, resolution, number of colors, refresh frequency, . . . ) in comparison to the third party television display 208. As computing power increases, the device 202 can stream or transfer contents for display on the third party television display 208. Even if F3 (e.g., the display) of the device 202 is functioning, the device 202 may still want to employ and share the third party television display 208 for displaying images (e.g., due to the enhanced output that can be rendered by the third party television display 208 in comparison to the output yielded from the display of the device 202).

Figure 3:
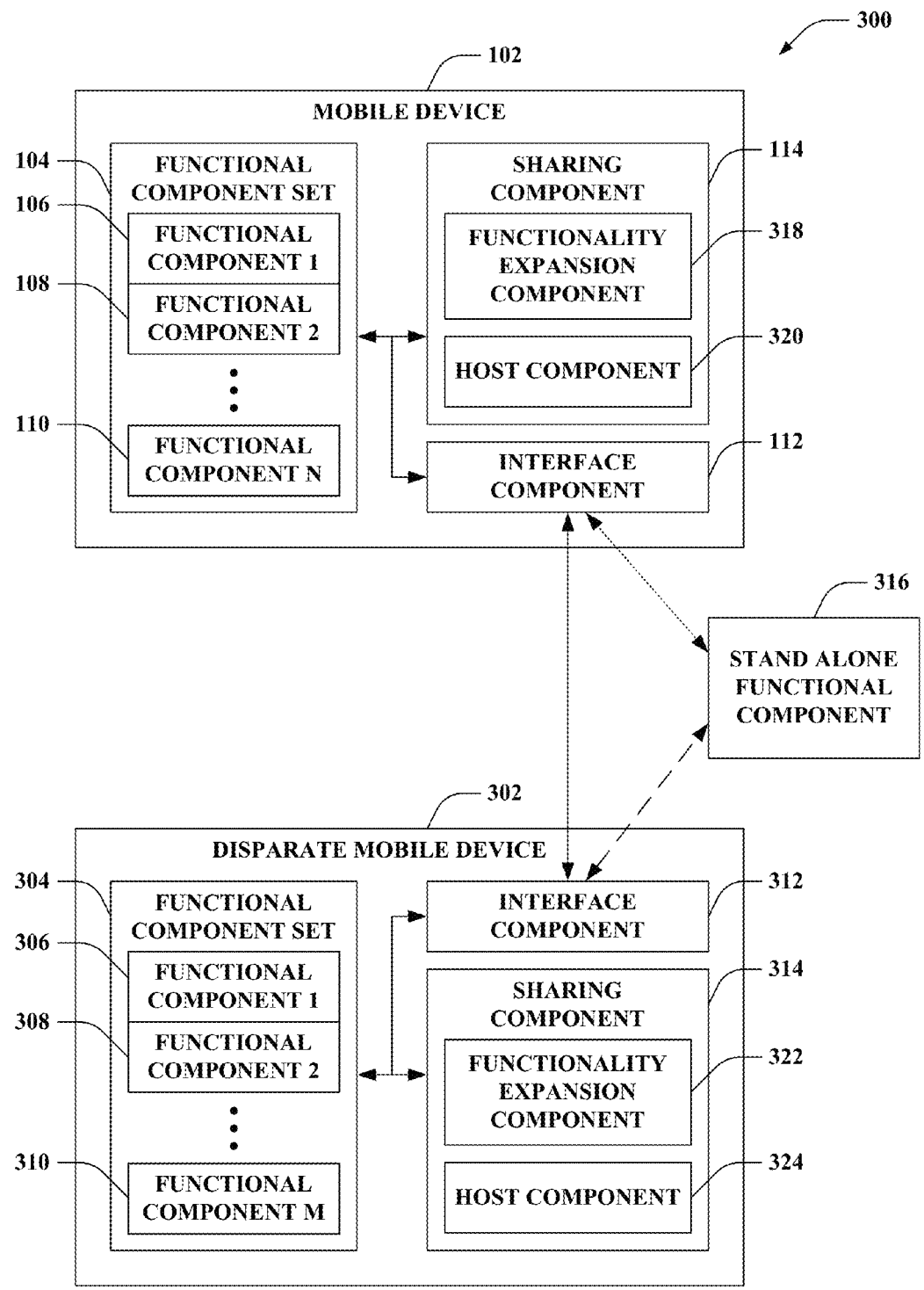
FIG. 3 is an illustration of an example system that shares functionality between mobile devices.

Now referring to FIG. 3, illustrated is a system 300 that shares functionality between mobile devices. The system 300 includes the mobile device 102, which can further comprise the functional component set 104 (e.g., functional components 106-110), the interface component 112, and the sharing component 114 as described herein. The mobile device 102 can be communicatively coupled with a disparate mobile device 302, which can be substantially similar to the mobile device 102. For instance, the disparate mobile device 302 can include a functional component set 304, which can comprise functional component 1 306, functional component 2 308, . . . , functional component M 310, where M can be substantially any integer. It is to be appreciated that the functional component set 306 can include substantially similar functional components 306-310 as compared to the functional components 106-110 included in the functional component set 104 of the mobile device 102. According to another illustration, at least one of the functional components 306-310 can be lacking from the functional component set 104 and/or at least one of the functional components 106-110 can be lacking from the functional component set 304; thus, the mobile device 102 and the disparate mobile device 302 (as well as any other mobile device(s)) need not have identical functional component sets, however, some functional elements supported by these devices 102 and 302 can be the same or similar (e.g., display, processor, memory, transceiver, a type of input component, a type of output component, power supply, auxiliary peripherals, . . . ). Moreover, the disparate mobile device 302 can include an interface component 312 and a sharing component 314 that can respectively be substantially similar to the interface component 112 and the sharing component 114 of the mobile device 102. Further, the system 300 can include a stand alone functional component 316 (e.g., the third party component 208 of FIG. 2) that can be communicatively coupled with the mobile device 102 and/or the disparate mobile device 302. The stand alone functional component 316 can be any type of resource such as, but not limited to, an input device (e.g., microphone, camera, video camera, scanner, keyboard, mouse, button, scanner, touch screen, sensor, bio sensor, fingerprint recognition, external peripherals), an output device (e.g., display, speaker, printer, HDTV, video projector, . . . ), a processor, memory, networking device (e.g., router, switch, hub, gateway, . . . ), a power supply, a combination thereof, and so forth. Although two mobile devices 102 and 302 and one stand alone functional component 316 are illustrated in FIG. 3, it is to be appreciated that the system 300 can include substantially any number of mobile devices similar to the mobile devices 102 and 302 and/or substantially any number of stand alone functional components similar to the stand along functional component 316.

The sharing components 114 and 314 of the mobile devices 102 and 302 can enable sharing functionality across the mobile devices 102 and 302 (e.g., functionality of the mobile device 102 can be shared with the disparate mobile device 302 and vice versa). The sharing component 114 of the mobile device 102 can further include a functionality expansion component 318 and a host component 320. Similarly, the sharing component 314 of the disparate mobile device 302 can include a functionality expansion component 322 and a host component 324. The functionality expansion component 318 identifies available functional component(s) outside of the mobile device 102 (e.g., functional components included in the system 300 other than the functional components 106-110 of the mobile device 102, functional components 306-310 and stand alone functional component 316, functional components within proximity made available for borrowing, sharing, . . . ) and enables the mobile device 102 to employ one or more of these functional component(s) identified as being available. Accordingly, the functionality expansion component 318 can leverage the available functional component(s) to enhance, supplement, replace, etc. functional components 106-110 of the mobile device 102. Similarly, the functionality expansion component 322 of the disparate mobile device 302 can recognize available functional component(s) in the system 300 that can be utilized by the disparate mobile device 302 other than the functional components 306-310 and employ one or more of these available functional component(s) to enhance, supplement, replace, etc. functionality (e.g., as provided by functional components 306-310) of the disparate mobile device 302.

Moreover, the host component 320 can allow other mobile device(s) (e.g., the disparate mobile device 302, external storage and peripherals, . . . ) to use one or more of the functional components 106-110 of the mobile device 102. For instance, the host component 320 can notify the other mobile device(s) as to information concerning the functional components 106-110 of the mobile device 102. Examples of such information can be, but is not limited to, types, characteristics, current operational statuses, availabilities, authorization requirements, performance metrics, costs, etc. of the functional components 106-110. Following this example, the host component 320 can transfer a signal to the functionality expansion component 322 of the disparate mobile device 312 (e.g., via the interface components 112 and 312) which indicates that one of the functional components 106-110 is a transceiver to a communications network that is currently operational for transmitting data to and/or receiving data from the communications network; additionally, an amount of bandwidth available for use with the transceiver, a cost for the disparate mobile device 302 to borrow the transceiver, a waiting list and/or queue for utilization of the transceiver, and/or any other information related to the transceiver can also be provided as part of the signal sent to the functionality expansion component 322 of the disparate mobile device 302. Additionally, the host component 320 can obtain a signal from the disparate mobile device 302 (e.g., originating from the functionality expansion component 322, . . . ) indicating that one or more of the functional components 106-110 have been selected to be shared by the disparate mobile device 302; also, any number of similar signals can be received from any number of other mobile devices (not shown). Accordingly, the host component 320 can authorize, authenticate, etc. the disparate mobile device 302 based upon the received signal (e.g., the authorization, authentication, etc. effectuated by the host component 320 can be performed with or without knowledge of a user of the mobile device 102). Further, the host component 320 can thereafter allow the selected one or more functional components 106-110 to be borrowed by the disparate mobile device 302. Although not described, it is to be appreciated that the host component 324 can operate in a similar fashion to allow sharing of the functional components 306-310 of the disparate mobile device 302.

Figure 4:
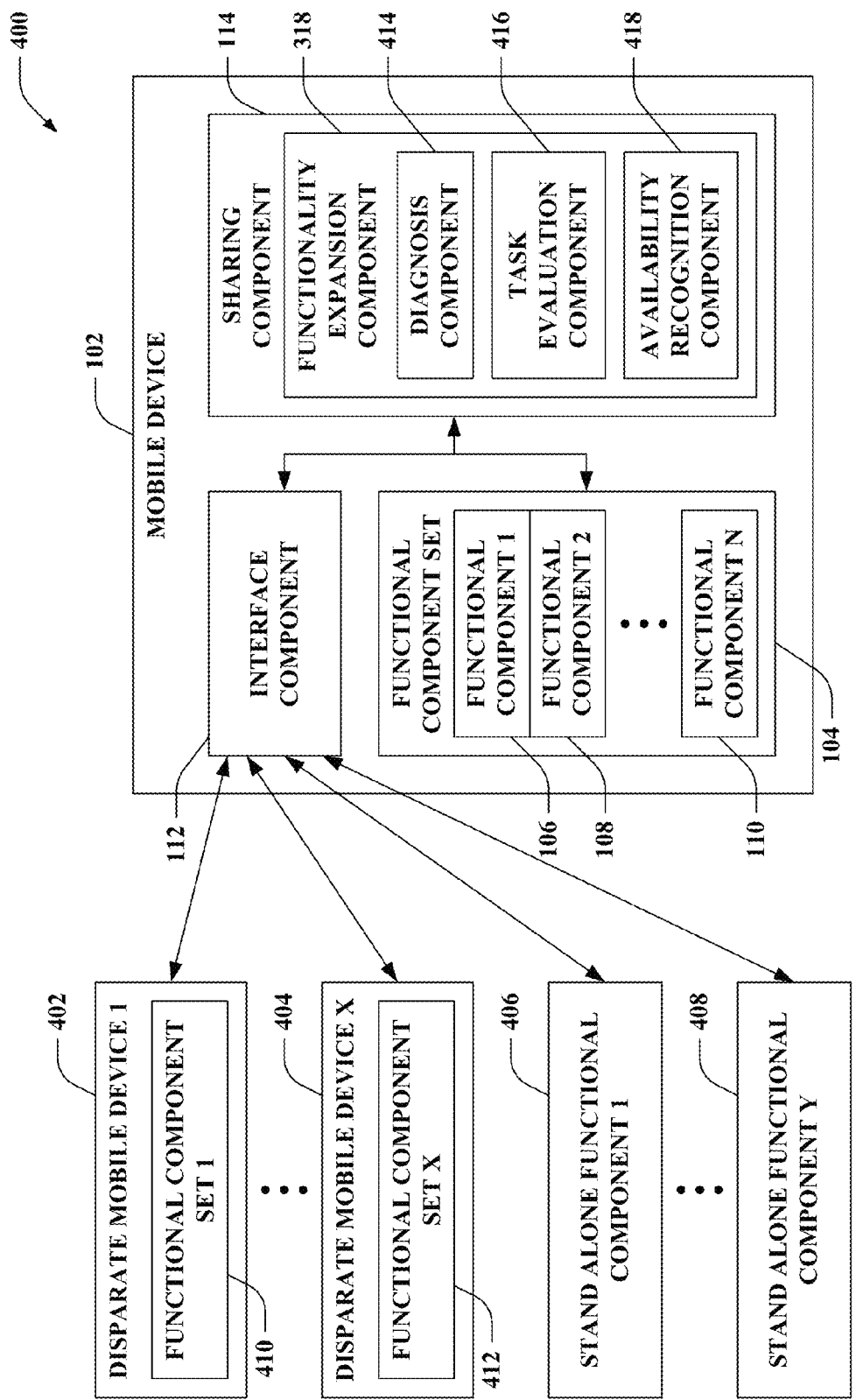
FIG. 4 is an illustration of an example system that enables a mobile device to borrow functionality from peer devices.

FIG. 4 illustrates a system 400 that enables a mobile device to borrow functionality from peer devices. The system 400 includes the mobile device 102, X disparate mobile devices (e.g., mobile device 1 402, . . . , mobile device X 404) where X can be substantially any integer, and Y stand alone functional components (e.g., stand alone functional component 1 406, . . . , stand alone functional component Y 408) where Y can be substantially any integer. Each of the disparate mobile devices 402-404 can each further comprise respective functional component sets that can be similar to the functional component set 104 of the mobile device 102 (e.g., the disparate mobile device 1 402 includes the functional component set 1 410, . . . , the disparate mobile device X 404 includes the functional component set X 412). The functional component sets 104, 410 and 412 can each include similar and/or differing functional components. Moreover, each of the disparate mobile devices 402-404 can be similar to the mobile device 102.

According to an illustration, the mobile device 102, the disparate mobile devices 402-404, and the stand alone functional components 406-408 can be within proximity of each other. By being in geographic proximity, the mobile device 102 can communicate (e.g., via a wireless and/or wired connection, via the interface component 112, . . . ) directly with any of the disparate mobile devices 402-404 and/or any of the stand alone functional components 406-408. Pursuant to another example, indirect communications can be effectuated. Following this example, the mobile device 102 can indirectly communicate with the disparate mobile device 1 402 (e.g., the mobile device 102 and the disparate mobile device 1 402 can be outside of a range over which communication can directly occur there between), where transmissions to and/or from the mobile device 102 can be routed through the disparate mobile device X 404; it is to be appreciated, however, that the claimed subject matter is not limited to these examples.

The functionality expansion component 318 can enable the mobile device 102 to use functional components hosted by (e.g., comprised in) the disparate mobile devices 402-404 and/or the stand alone functional components 406-408. Moreover, the functionality expansion component 318 can include a diagnosis component 414, a task evaluation component 416, and an availability recognition component 418. The diagnosis component 414 monitors the functional components 106-110 of the mobile device 102. For instance, the diagnosis component 414 can recognize whether one or more of the functional components 106-110 become disabled, unavailable, inactivated, inefficient, and so forth. By way of example, the diagnosis component 414 can identify loss of a connection (or a degraded connection) of a transceiver to a communications network; however, the claimed subject matter is not so limited. Moreover, the diagnosis component 414 can evaluate performance of the functional component 106-110 to identify one or more functional components 106-110 that detrimentally impact performance of other functional components 106-110 in the functional component set 104 and/or the performance of the mobile device 102 generally. Thus, by way of illustration, the diagnosis component 414 can determine that limited processing power provided by the functional component 1 106 is causing poor sound quality to be outputted by the functional component 2 108 (e.g., where the functional component 2 108 is able to yield better sound quality when sufficient processing power is utilized). Again, the claimed subject matter is not limited to this illustration. Further, in accordance with an example, the diagnosis component 414, upon recognizing that one or more of the functional components 106-110 has become disabled, unavailable, inactivated, inefficient, and so forth, can attempt to repair such malfunctioning functional component(s) 106-110.

Meanwhile, the task evaluation component 416 can analyze a task to be performed by the mobile device 102 and select functional elements (e.g., local and/or remote functional components) to be used to accomplish the task based upon the analysis. The task evaluation component 416 can determine needed and/or optional functionality used to effectuate a given task. Moreover, the task evaluation component 416 can operate in conjunction with the diagnosis component 414 such that needed and/or optional functionality associated with the task to be performed or being effectuated can be compared to the evaluated functionality that can be provided by the functional components 106-110 of the mobile device 102. Accordingly, any shortcomings of the functional components 106-110 with relation to performing the task can be identified. Upon determining that the functional components 106-110 are deficient in some manner for effectuating the task, the mobile device 102 can seek to add/borrow functionality from the disparate mobile devices 402-404 and/or the stand alone functional components 406-408 to address this deficiency. The task evaluation component 416 can review the task prior to operation and/or during operation for carrying out the task. Further, the task evaluation component 416 can analyze a completed task to generate feedback, which can be used to tailor review of subsequent task(s).

Further, the availability recognition component 418 can identify available functional components hosted by differing devices (e.g., the disparate mobile devices 402-404, the stand alone functional components 406-408, . . . ) that can be shared by the mobile device 102 to supplement, replace, enhance, etc. functionality of the mobile device 102. The availability recognition component 418 can determine that the disparate mobile devices 402-404 and the stand alone functional components 406-408 are within communication range of the mobile device 102 (e.g., currently and/or able to be communicatively coupled to the mobile device 102). Further, the availability recognition component 418 can identify functional components provided by these devices in range that are made available for sharing (e.g., sharing by the mobile device 102) as well as any properties, characteristics, types, current operational statuses, availabilities, authorization requirements, performance metrics, costs, etc. related to the available functional components (e.g., based upon signals received from the disparate mobile devices 402-404 and the stand alone functional components 406-408). Accordingly, if the disparate mobile device 1 402 makes available all or a subset of functional components in the functional component set 1 410, then the availability recognition component 418 can identify this availability of these functional components.

Based upon the functionality provided by the functional components 106-110, the perceived functionality needed or optionally needed to effectuate a task, and/or the functional components available to be shared with the mobile device 102, the functionality expansion component 318 can borrow accessible resources. For instance, peer to peer sharing can happen automatically by the functionality expansion component 318 borrowing accessible resources from other disparate mobile devices 402-404 and/or stand alone functional components 406-408 when needed by the mobile device 102. Further, the user of the mobile device 102 can explicitly opt in or opt out of employing such an automatic feature. By way of another example, the functionality expansion component 318 can borrow functionality from peer(s) based at least in part in response to user input (e.g., the user can select functional component(s) to borrow, devices from which to borrow functional component(s), . . . ).

The following illustrates an example of utilizing the peer to peer sharing described herein, yet the claimed subject matter is not so limited. The mobile device 102 can lose network connectivity (e.g., as determined by the diagnosis component 414) while in vicinity of the disparate mobile devices 402-404 and/or the stand alone functional components 406-408, one or more of which are determined via the availability recognition component 418 to have network connectivity as well as to be making such network connectivity available for sharing. Accordingly, the functionality expansion component 318 can operate to automatically attempt (and/or attempt in response to user input) to transfer calls to the disparate mobile devices 402-404 and/or the stand alone components 406-408 in vicinity that do have connectivity as a conduit for phone calls to/from the user mobile device 102. Thus, upon transferring, the call to/from the mobile device 102 can be routed through one or more of the peers.

Moreover, the functionality expansion component 318 can employ a buddy list; for instance, the disparate mobile device 1 402 and the stand along functional component Y 408 can be included in the buddy list. Accordingly, when needed, the functionality expansion component 318 can request use of functional components made available by devices included in the buddy list. For example, the buddy list can include devices trusted by the mobile device 102 (and/or a user thereof) (e.g., for handling of sensitive data, . . . ); under this scenario, the functionality expansion component 318 can be limited to use of functional components made available by devices included in the buddy list. Alternatively, the buddy list can be utilized as a starting point for identifying available functional components, but if devices on the buddy list fail to meet the need of the functionality expansion component 318, then functional components from devices other than those included on the buddy list can be utilized.

Figure 5:
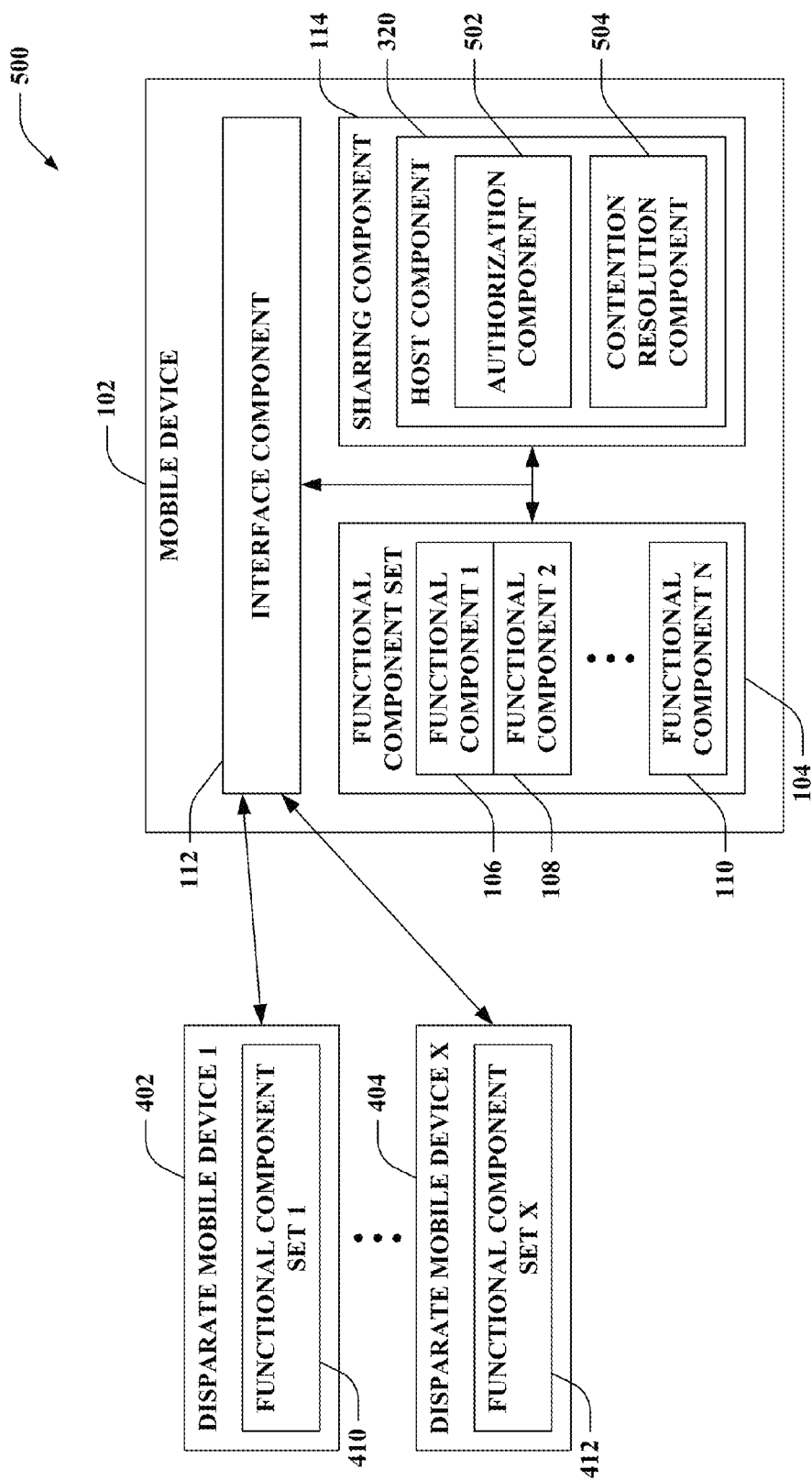
FIG. 5 is an illustration of an example system that enables a mobile device to make functionality available to peers in a peer to peer network.

Now referring to FIG. 5, illustrated is a system 500 that enables a mobile device to make functionality available to peers in a peer to peer network. The system 500 includes the mobile device 102 and the disparate mobile devices 402-404 as described above. Further, although not shown the system 500 can include the stand alone functional components 406-408. The mobile device 102 can cause the functional components 106-110 (or a subset thereof) to be obtainable for use by one or more of the disparate mobile devices 402-404 (e.g., via the host component 320).

The host component 320 can notify all or a subset of the disparate mobile devices 402-404 in proximity of the availability concerning one or more of the functional components 106-110. Various information can be sent related to the available one or more functional components 106-110 as described herein. Further, for instance, a predefined list such as a buddy list can be employed to disseminate the availability related information to particular disparate mobile devices 402-404 (e.g., a subset of such devices 402-404) when in range such that transmission of the availability related information can be inhibited to the remainder of the disparate mobile devices 402-404 excluded from the buddy list. According to another illustration, the availability information can be broadcasted by the mobile device 102 to all devices 402-404 within range. By way of further example, the availability information can be sent to a disparate mobile device (e.g., the disparate mobile device 1 402) that recognizes that the mobile device 102 is within proximity, where the information can be sent by the host component 320 (and/or the mobile device 102 in general) in response to receiving a query concerning whether the mobile device 102 has functionality available for sharing. Moreover, a centralized or distributed database of available functional components including the functional components 106-110 made available by the host component 320 of the mobile device 102 (as well as any other functional components made available by host components of disparate mobile devices 402-404 and/or stand alone functional components) can be employed.

The host component 320 can automatically share one or more of the functional components 106-110 of the mobile device 102 (e.g., the functional components 106-110 can be shared with or without knowledge of a user of the mobile device 102). Additionally or alternatively, sharing by the host component 320 can be controlled by explicit user instruction (e.g., opting in or out of sharing any of the functional components 106-110 when available and/or opting in or out of sharing a subset of the functional components 106-110). One or more of the functional components 106-110 can be made available for borrowing when such components 106-110 fail to be consumed (e.g., partially or completely) by the mobile device 102, for example (e.g., under the automatic and/or opt in/out schemes).

The host component 320 can further include an authorization component 502 that authorizes and/or authenticates disparate mobile device(s) 402-404 that select to employ one or more of the functional components 106-110 made available by the host component 320. For instance, the authorization component 502 can employ a buddy list such that if a disparate mobile device 402-404 that requests to use a functional component 106-110 is included in the buddy list, then the disparate mobile device 402-404 can proceed with such use, while no such use can occur when the requesting disparate mobile device 402-404 is not included in the buddy list. Additionally or alternatively, any type of credential can be used by the authorization component 502 when evaluating whether to allow the requesting disparate mobile device 402-404 to employ one or more of the functional components 106-110 made available for borrowing. Moreover, the authorization component 502 can enable particular type(s) of disparate mobile device(s) 402-404 to use the available functional components 106-110, while inhibiting utilization by other type(s) (e.g., a cell phone can be authorized while an MP3 player or PMP can be prohibited from using one or more of the available functional components 106-110, or other external peripherals and storage, . . . ). Further, the authorization component 502 can enable a requesting disparate mobile device 402-404 to employ one or more of the available functional components 106-110 as a function of a task to be performed by the requesting disparate mobile device 402-404; for example, the authorization component 502 can inhibit use of an available display of the mobile device 102 by a requesting disparate mobile device 402-404 desiring to perform the task of rendering pornography upon the display.

Moreover, a contention resolution component 504 can be included in the host component 320. When multiple disparate mobile devices 402-404 vie to compete for the same functional component 106-110 made available by the mobile device 102, if the functional component 106-110 is or would become exhausted, then the contention resolution component 504 can address such conflict. The contention resolution component 504 can allow a subset of the competing disparate mobile devices 402-404 to use the desired functional component 106-110. Various metrics can be utilized by the contention resolution component 504. For instance, a buddy list of the mobile device 102 can be consulted by the convention resolution component 504 to give preferential treatment to buddies over non-buddies. Further, the contention resolution component 504 can allocate the limited resource based upon perceived needs corresponding to each of the contending devices 402-404 (e.g., a device that lacks any network connectivity can be given preference over a device seeking supplemental network connectivity, replacement versus supplement of a functional element, . . . ). In accordance with another example, merit of the tasks to be performed can be utilized by the contention resolution component 504 to effectuate a selection (e.g., rendering a patient's medical records can be given preference by the contention resolution component 504 over rendering a joke email upon a display of the mobile device 102, . . . ). Moreover, the contention resolution component 504 can predict an expected amount of time of use of the resource desired to be utilized by each of the competing devices 404-406; based upon these expected amounts of time as well as when the resource in question may be employed by the mobile device 102 (e.g., a time at which the resource may become unavailable for sharing and/or a lesser portion of the resource can be available for borrowing, . . . ), the contention resolution component 504 can allocate employment of the resource.

Figure 6:
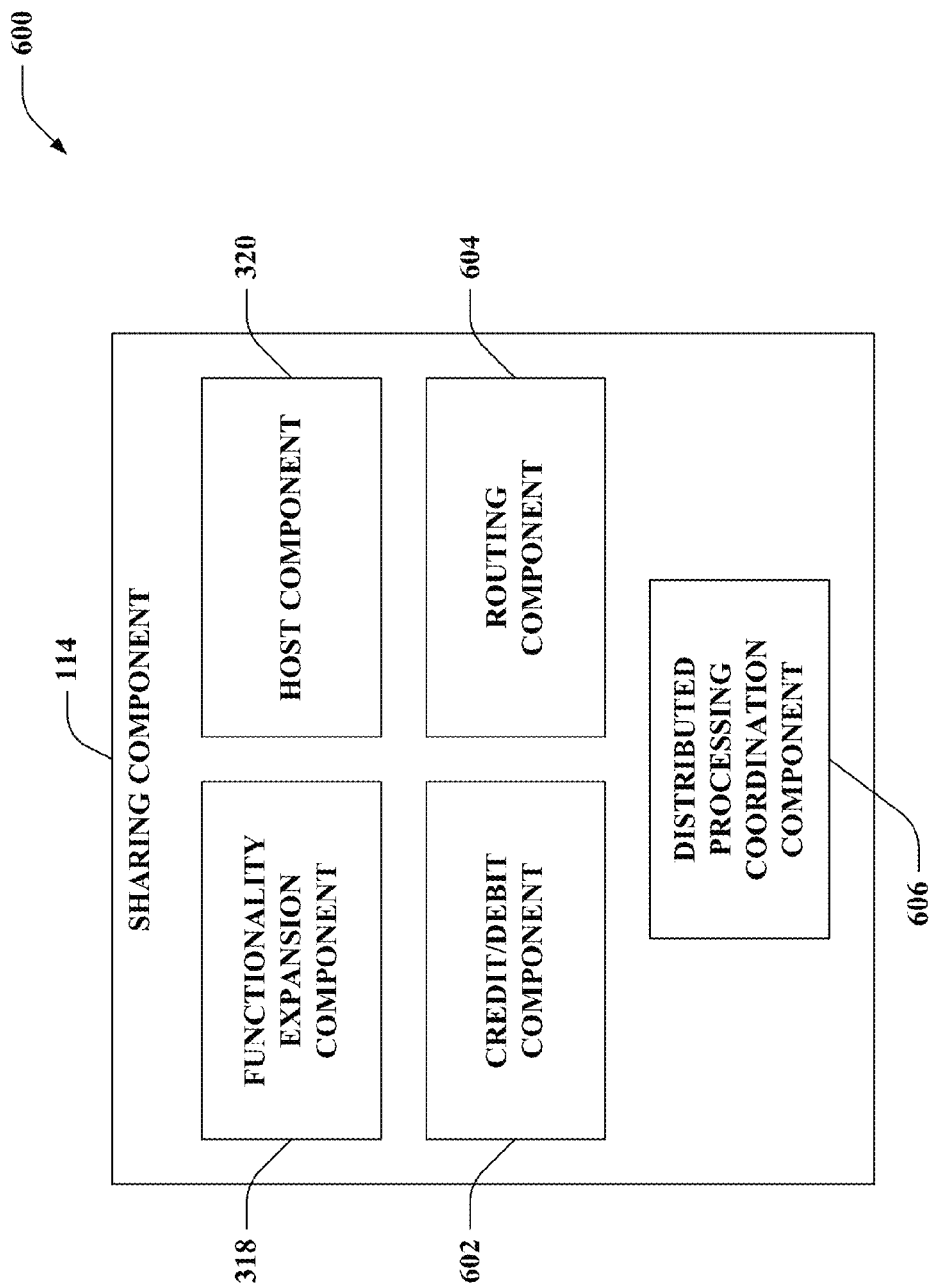
FIG. 6 is an illustration of an example system that enables sharing of functionality in a peer to peer network.

FIG. 6 illustrates a system 600 that enables sharing of functionality in a peer to peer network. The system 600 includes the sharing component 114, which can further comprise the functionality expansion component 318 that allows for borrowing remote functional components of disparate devices and the host component 320 that enables local functional components to be shared with disparate devices. The sharing component 114 can be included in a mobile device, a stand alone functional component, and so forth.

The sharing component 114 can further include a credit/debit component 602 that can maintain an account associated with the sharing component 114. Credit or other incentives can be realized if a user opts into sharing. Thus, when the host component 320 allows disparate devices to employ local functional component, credits can be accrued in the account of the sharing component 114 (e.g., the account can be maintained by the credit/debit component 602). Moreover, these credits can be deducted from the account maintained by the credit/debit component 602 when the functionality expansion component 318 borrows use of the remote functional components. By way of example, the credit/debit component 602 can be used to conduct auction based transactions of functional elements; accordingly, if more than one device vie for a common available functional element, credit/debit components (e.g., such as the credit/debit component 602) of each of the devices can enable the respective devices to bid for the use of the available functionality.

According to another illustration, the sharing component 114 can include a routing component 604 that routes data to be transmitted via one or more peers. The routing component 604 can be used to obtain an indirect connection to a network through an intermediary node (e.g., disparate mobile device). Data transmissions can be sent via this intermediary node (as well as any additional number of intermediary nodes) by being routed with the routing component 604. For instance, the routing component 604 can package data transferred to an intermediary node with instructions for forwarding such data to the intended destination. In accordance with another example, the routing component 604 can be utilized to create connection redundancy. Following this example, a mobile device associated with the sharing component 114 can be directly connected to a communications network while the routing component 604 can dynamically determine secondary, tertiary, etc. paths to the communications network through disparate mobile devices and/or stand alone functional components; thus, in the event of losing the direct connection to the communications network, the routing component 604 can seamlessly re-route communications with the communications network via one or more of the secondary, tertiary, etc. paths.

In accord with another example, the sharing component 114 can include a distributed processing coordination component 606. Hybrid processing may be implemented where multiple processors of nearby mobile devices can be shared. Some processing can be performed locally at a first mobile device and complementary processing can be performed by second, third fourth, etc. mobile devices as needed for extra processing power. The distributed processing coordination component 606 can orchestrate such hybrid processing. Namely, the distributed processing coordination component 606 can decipher when to initiate remote processing as compared to solely effectuating processing using local resources. Further, the distributed processing coordination component 606 of the sharing component 114 can cooperate with disparate distributed processing coordination component(s) of disparate sharing components (e.g., which can correspond to disparate mobile devices and/or stand alone functional components). More particularly, the distributed processing coordination component 606 can segment a processing task to be performed and request particular disparate mobile devices to carry out such respective segments (e.g., requests can be transmitted to the disparate distributed processing coordination component(s) corresponding to the disparate mobile device(s)). According to another illustration, the distributed processing coordination component 606 can receive requests to carry out processing of a segment of a task from a disparate mobile device (e.g., from a disparate distributed processing coordination component of this disparate mobile device).

Figure 7:
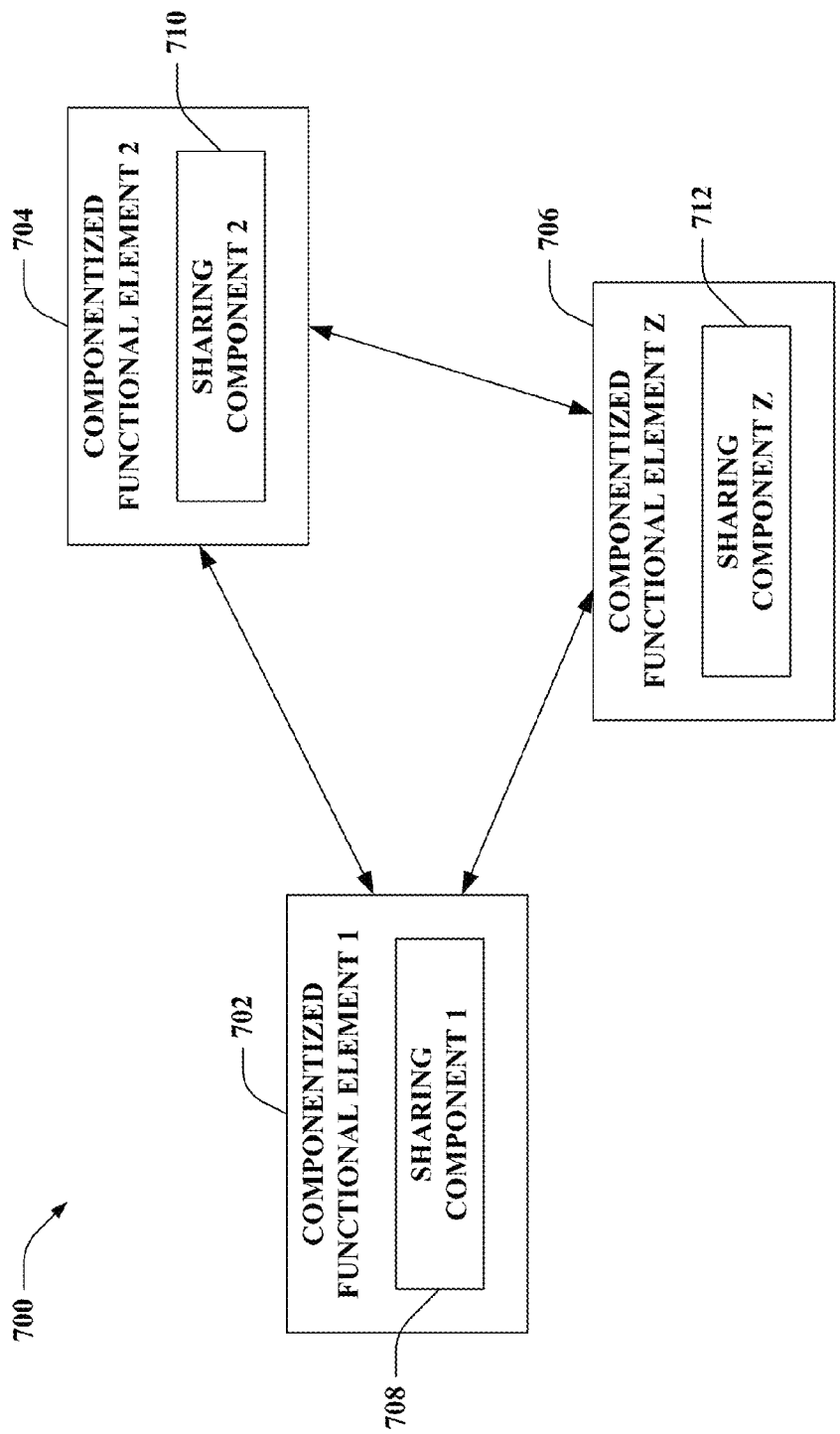
FIG. 7 is an illustration of an example system that utilizes componentized mobile devices in a peer to peer network.

Referring to FIG. 7, illustrated is a system 700 that utilizes componentized mobile devices in a peer to peer network. The system 700 includes a componentized functional element 1 702, a componentized functional element 2 704, . . . , and a componentized functional element Z 706, where Z can be substantially any integer. Each of the componentized functional elements 702-706 can be within proximity of one another, and thus, each of the componentized functional elements 702-706 can directly communicate with one another. Although not shown, according to another example, the componentized functional element 1 702 can be coupled to the componentized functional element 2 704, and the componentized functional element 2 704 can be coupled to the componentized functional element Z 706 without the componentized functional element 1 702 and the componentized functional element Z 706 being directly coupled; thus, the componentized functional elements 702 and 706 can communicate indirectly via the componentized functional element 2 704, which acts as an intermediary node. Further, each of the componentized functional elements 702-706 can include a respective sharing component (e.g., the componentized functional element 1 702 can include the sharing component 1 708, the componentized functional element 2 704 can include the sharing component 2 710, . . . , the componentized functional element Z 706 can include the sharing component Z 712). Further, each sharing component 708-712 can be substantially similar to the sharing component 114 described herein. By leveraging the sharing components 708-712, each of the componentized functional elements 702-706 can borrow functionality made available by any of the other componentized functional elements 702-706. Further, the sharing components 708-712 can enable each of the componentized functional elements 702-706 to make their respective functionalities accessible for being borrowed by any of the other componentized functional elements 702-706.

Each of the componentized functional elements 702-706 can be an independent element. A mobile device, such as the mobile device 102 as described herein, can be split into smaller parts, each of which can be referred to as the componentized functional elements 702-706. As such, the componentized functional elements 702-706 can be more manageable and/or more flexible in comparison to use of the single integrated device. For instance, the componentized functional elements 702-706 can each be a respective one of a display, a processor, memory, a transceiver, an input component, an output component, a power source, and so forth.

Each of the functional parts of a mobile device that are conventionally provided as a single integrated device can be componentized into the componentized functional elements 702-706 (e.g., each of the functional components 106-110 of the mobile device 102 can be componentized). Hence, components of one device can share and use components of another device. This can be desirable if one of the device's components becomes lost or dysfunctional (e.g., the user could still utilize the device by borrowing functionality from third party components that are not lost or broken, . . . ). For instance, if a voice communicator component of a first user is not functioning, then a voice communicator component of a second user can be substituted for the dysfunctional component. However, the claimed subject matter is not so limited.

Figure 8:
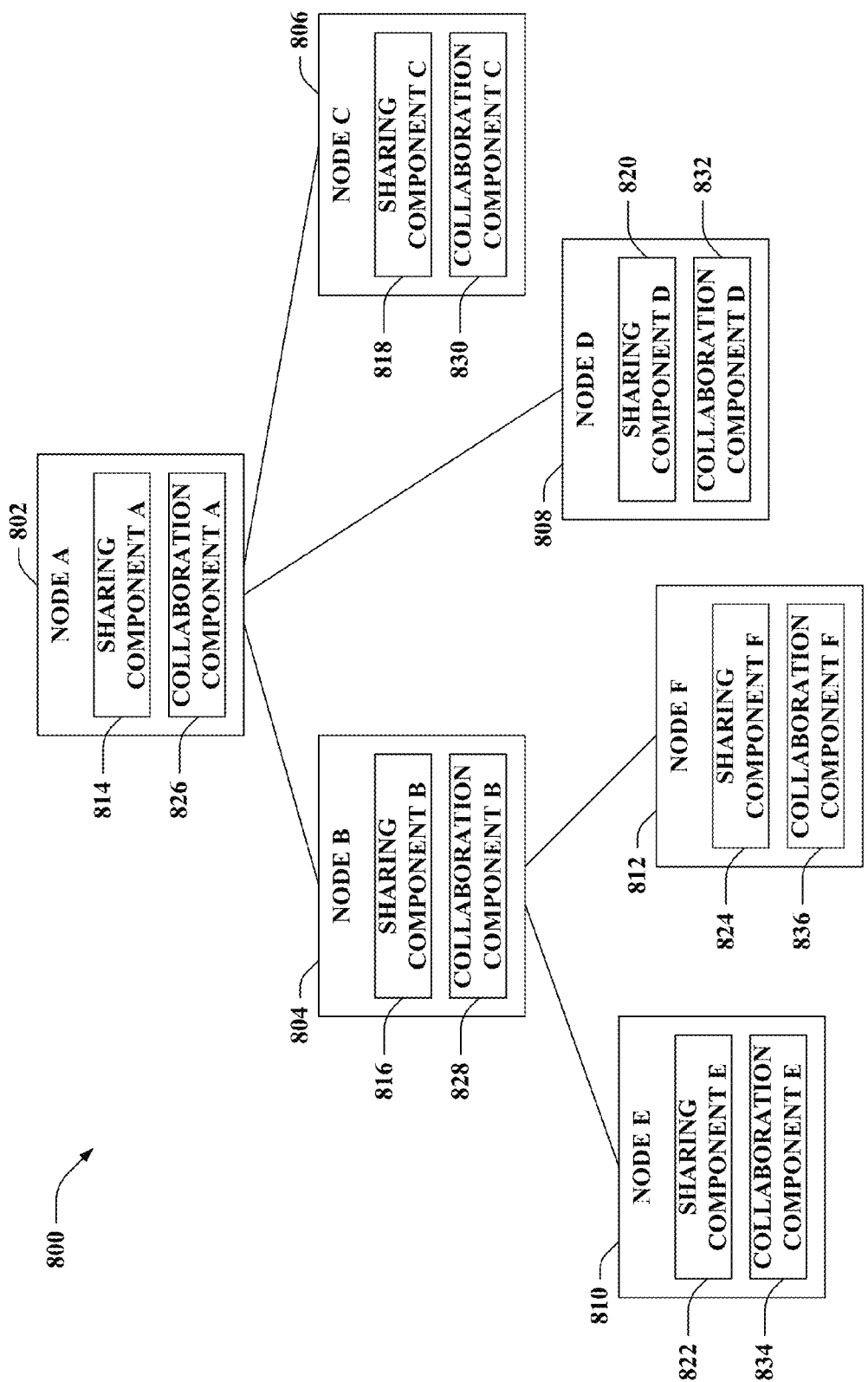
FIG. 8 is an illustration of an example mesh network of mobile devices that share functionality.

Turning to FIG. 8, illustrated is an example mesh network 800 of mobile devices that share functionality. Mobile devices can connect directly or indirectly to other mobile devices within the mesh network 800. Further, each of the devices in the mesh network 800 can share various resources (e.g., functional components of each of the devices can be shared with disparate devices). Each of the mobile devices can be located at a respective node within the mesh network 800; for instance, the mobile device located at a particular node in the mesh network 800 can be referred to as that particular node (e.g., a mobile device at node A 802 can be referred to as node A 802, . . . ) of the mesh network 800.

According to the illustrated example, the mesh network 800 includes node A 802, which is directly connected to node B 804, node C 806, and node D 808. Further, node B 804 is also directly connected to node E 810 and node F 812. It is to be appreciated, however, that the claimed subject matter is not limited to the arrangement shown in the mesh network 800; rather, any number of nodes (e.g., mobile devices, stand alone functional components such as external storages, sensors, scanners and other peripherals, . . . ) can be included in the mesh network 800 and any direct connections can exist between nodes within the mesh network 800.

Each of the nodes 802-812 includes a respective sharing component and collaboration component. Hence, the node A 802 includes a sharing component A 814 and a collaboration component A 826, the node B 804 includes a sharing component 816 and a collaboration component B 828, the node C 806 includes a sharing component 818 and a collaboration component 830, the node D 808 includes a sharing component 820 and a collaboration component 832, the node E 810 includes a sharing component 822 and a collaboration component 834, and a node F 812 includes a sharing component 824 and a collaboration component 836. The sharing components 814-824 can be substantially similar to the sharing component 114 described above. Thus, for example, the sharing components 814-824 enable allowing other nodes to use functionality provided by each of the mobile devices and/or utilizing functionality made available for sharing by other mobile devices at disparate nodes in the mesh network 800. Further, the collaboration components 826-836 can enable collecting information from nodes 802-812 (e.g., peer mobile devices, peer stand alone functional components, . . . ) in a group within the mesh network 800. Moreover, the collaboration components 826-836 facilitate sharing information and/or services between nodes 802-812.

As shown in FIG. 8, mobile devices collectively provide a mesh network 800 of devices, with each device capable of sharing processing, communication, connectivity, and/or information resources with one another in a peer to peer manner. In such an arrangement, one can view any subset of peer to peer mobile devices (e.g., subset of the nodes 802-812) as a collaborative grouping, in some way sharing information or services with one another. The collaboration components 826-836 can enable forming these collaborative groupings as well as sharing information, functionalities, services, and the like. It is also noted that aggregating information from a collaborative grouping of multiple users of mobile devices (e.g., a set of users sharing a common geographical point) creates additionally useful sharing scenarios.

For instance, in the case where all cell phones operating in a collaborative manner are designated nearby a particular location on the highway, all nearby neighbor mobile devices in the grouping are collaboratively publishing information about the location on the highway. Even the mere fact that X or more mobile devices are in the particular location is an indication by itself of traffic levels. In this sense, a holistic time varying view of all traffic in a given area or route can be proxied by the number of mobile devices sharing information at or nearby given locations on the area or route. For neighbors in a particular location, information is passed to a server or service that categorizes the information and its time varying statistics.

Such a service spawns additional scenarios as well. For instance, today, map based driving directions provided on the Internet are distance based or time based, but never dynamically tuned to traffic conditions on the fly. With all mobile devices publishing traffic information, ongoing querying of the dynamic traffic conditions enables alternate routes to avoid recently occurring accidents, or roadblocks. The ability to share functionality and information across mobile devices is thus a powerful benefit, enabling a variety of scenarios.

Referring now to FIGS. 9-13, methodologies that can be implemented in accordance with various aspects described herein are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies in accordance with the claimed subject matter.

Furthermore, the claimed subject matter may be described in the general context of computer-executable instructions, such as program modules, executed by one or more components. Generally, program modules include routines, programs, objects, data structures, etc., that perform particular tasks or implement particular abstract data types. Typically the functionality of the program modules may be combined or distributed as desired in various embodiments. Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers, . . . ). Such components, inter alia, can automate certain mechanisms or processes performed thereby to make portions of the systems and methods more adaptive as well as efficient and intelligent.

Figure 9:
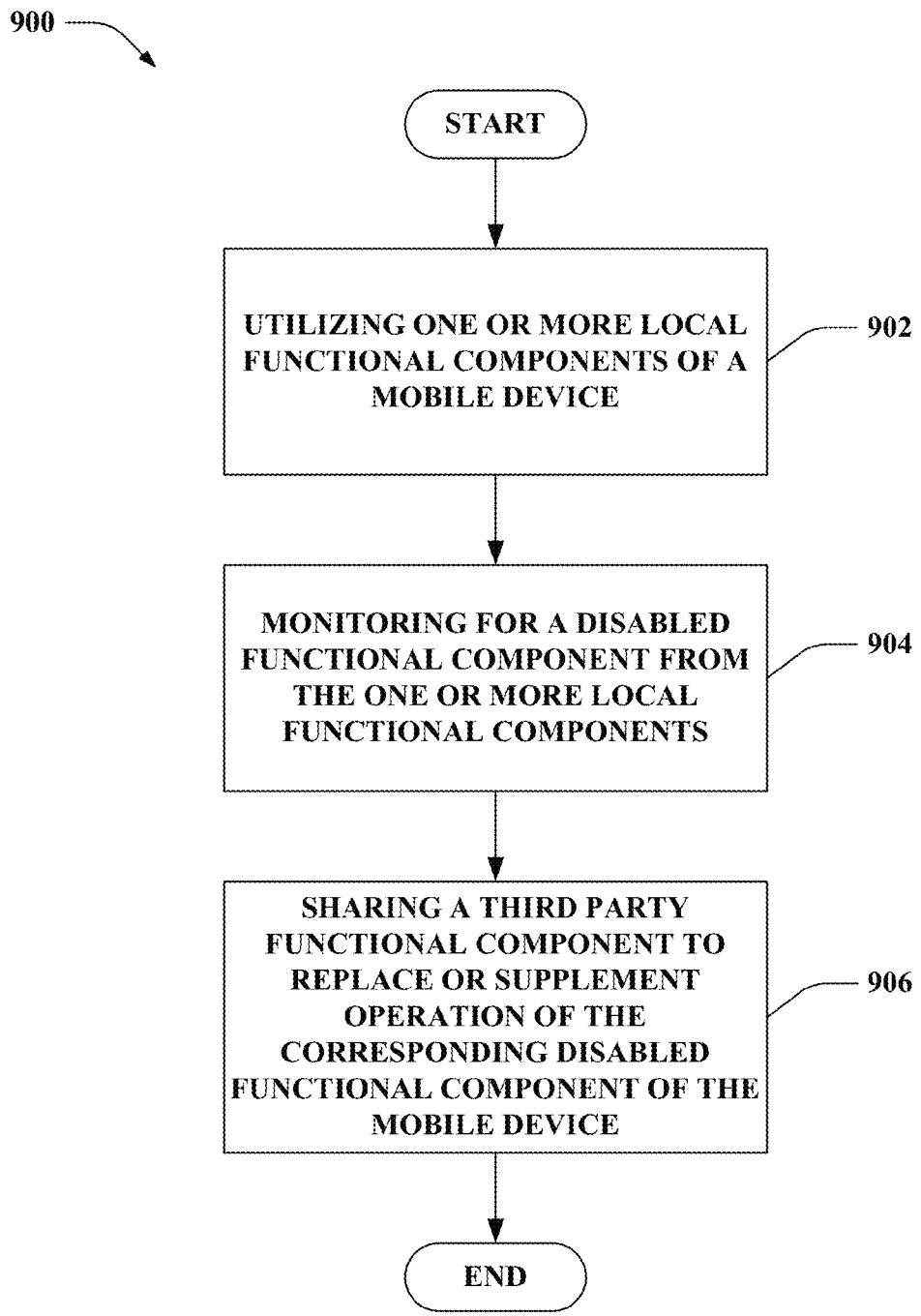
FIG. 9 is an illustration of an example methodology for using in connection with a mobile device.

Referring now to FIG. 9, illustrated is an example methodology 900 for using in connection with a mobile device. At 902, one or more local functional components of a mobile device can be utilized. The local functional components can include transceiver communications, power, processing, memory, input, and output for the mobile device. At 904, a disabled functional component from the one or more local functional components can be monitored for. For example, loss of a network connection of the mobile device, inability to sufficiently render an image upon a display of the mobile device, loss of power for the mobile device, and the like can be identified; however, it is to be appreciated that the claimed subject matter is not limited to these examples. At 906, a third party functional component can be shared to replace or supplement operation of the corresponding disabled functional component of the mobile device. The third party functional component can be made available for sharing by a disparate mobile device, a stand alone functional component, or the like. Further, sharing can be effectuated automatically by the mobile device and/or in response to an input from a user of the mobile device. According to another example, authorization and/or authentication of the mobile device (and/or a user thereof) can be performed while attempting to share the third party functional component.

Figure 10:
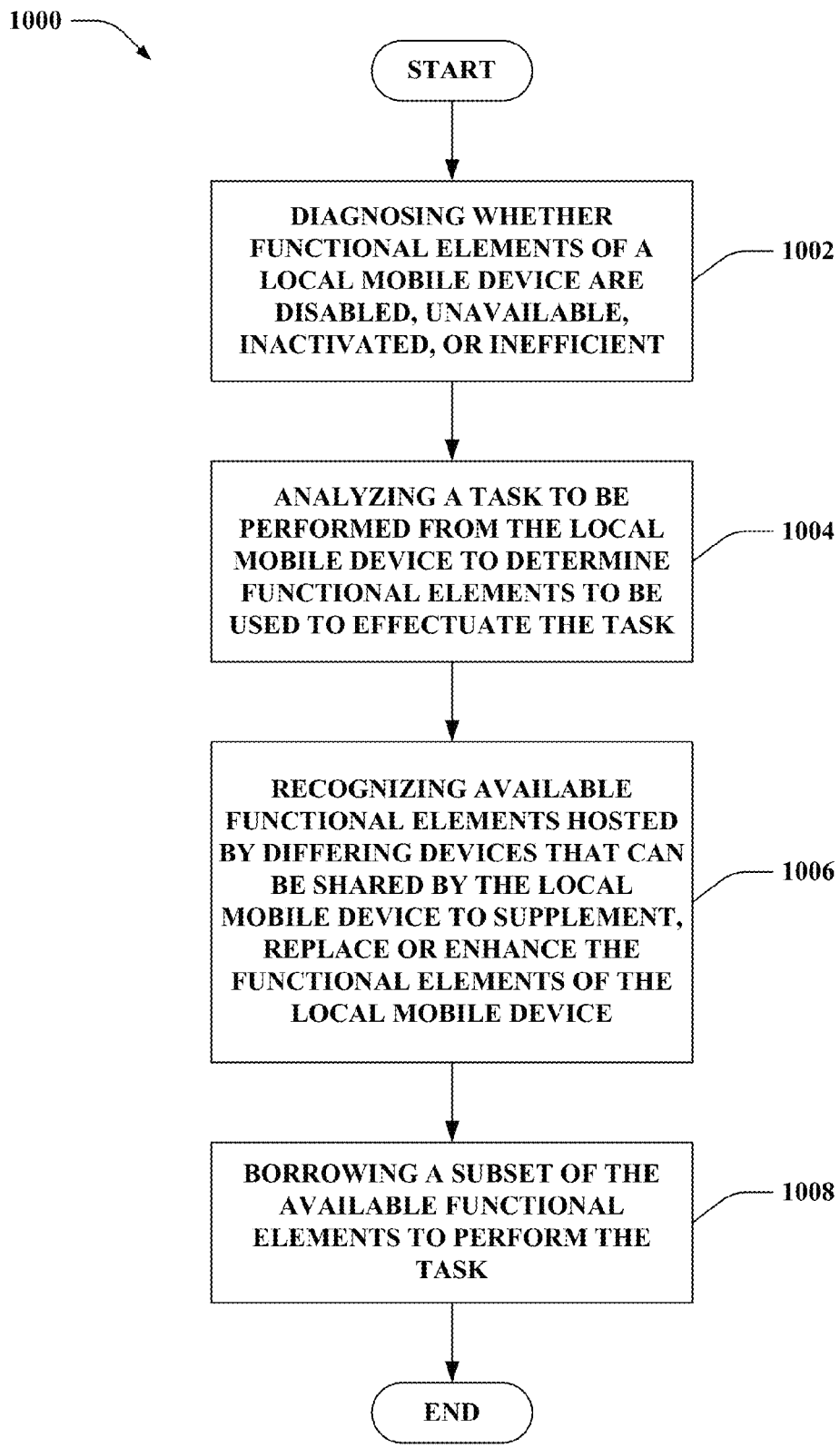
FIG. 10 is an illustration of an example methodology that facilitates leveraging functional elements hosted by differing devices in a peer to peer network.

Now turning to FIG. 10, illustrated is an example methodology 1000 that facilitates leveraging functional elements hosted by differing devices in a peer to peer network. At 1002, a diagnosis can be generated as to whether functional elements of a local mobile device are disabled, unavailable, inactivated, or inefficient. For example, one or more functional elements of the local mobile device can be malfunctioning. According to another illustration, the functional elements of the local mobile device may lack an ability to perform a particular function (e.g., the functional elements of the local device may fail to include a microphone to collect inputted sound, or lacking functional elements to perform scanning or bio-sensing authentication, . . . ). At 1004, a task to be performed from the local mobile device can be analyzed to determine functional elements to be used to effectuate the task. For instance, any type of task to can be performed by the local mobile device. By way of example, the task can be to record a speaker's voice and save the recording in memory. Thus, the analysis of the task can lead to a determination that processing, power, memory, and a microphone are needed, yet the local mobile device can lack an ability to collect the voice data (e.g., the local mobile device can lack the microphone). It is to be appreciated, however, that the claimed subject matter is not limited to this example. At 1006, available functional elements hosted by differing devices that can be shared by the local mobile device to supplement, replace or enhance the functional elements of the local mobile device can be recognized. Following the aforementioned microphone example, a microphone of a disparate mobile device made available for sharing can be identified. As noted, the functional elements of the differing devices can be used to supplement, replace or enhance functional elements of the local mobile device; the need for supplementation, replacement, or enhancement can be analyzed based at least in part upon the diagnosis of the functional elements of the local mobile device and/or the analysis of the task to be performed. At 1008, a subset of the available functional elements can be borrowed to perform the task. Thus, the task can be carried out using functional elements of the local mobile device and/or the borrowed functional elements.

Figure 11:
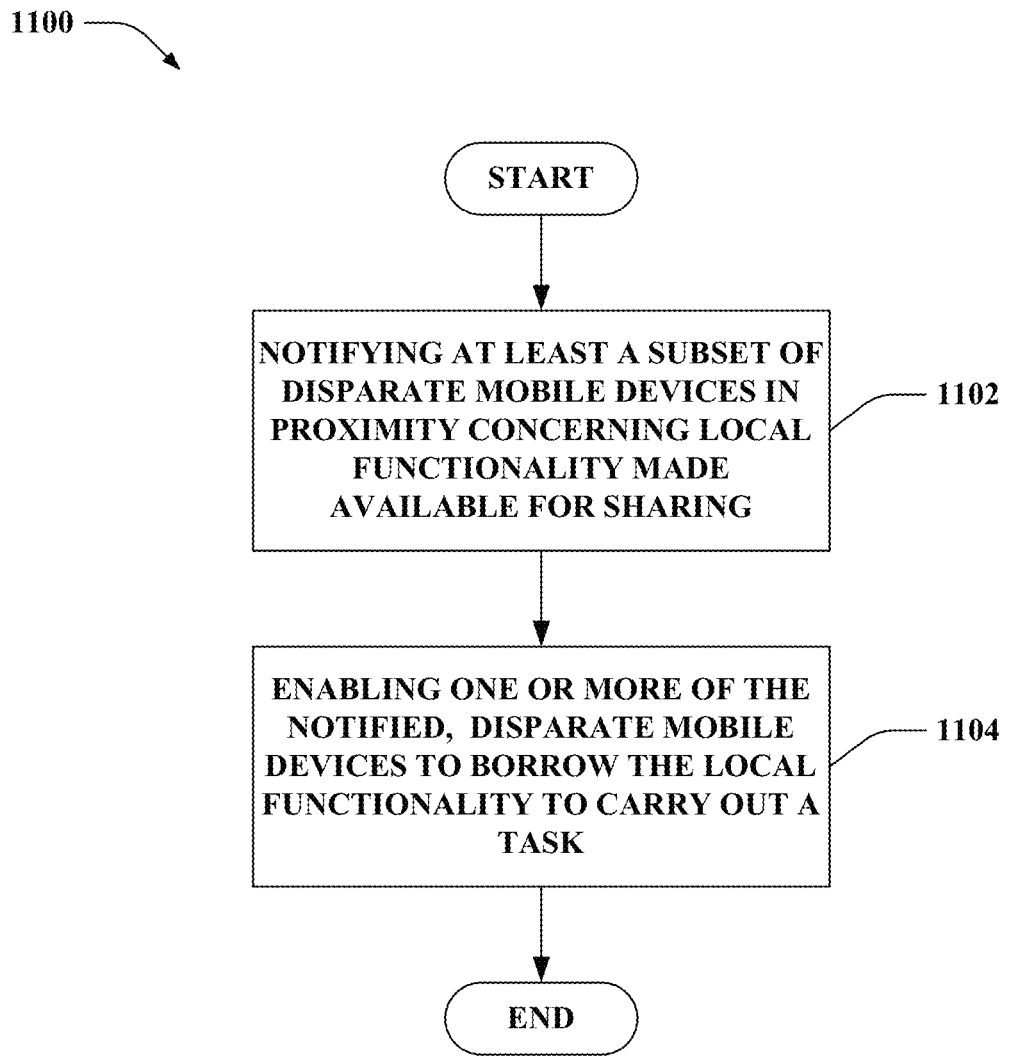
FIG. 11 is an illustration of an example methodology that facilitates making functionality of a local mobile device available for peer(s) in a peer to peer network to share.

Referring to FIG. 11, illustrated is an example methodology 1100 that facilitates making functionality of a local mobile device available for peer(s) in a peer to peer network to share. At 1102, at least a subset of disparate mobile devices in proximity (e.g., in vicinity of the local mobile device) can be notified concerning local functionality made available for sharing. Information related to the availability can be communicated to the subset of disparate mobile devices. Examples of such information can be, but is not limited to, types, characteristics, current operational statuses, availabilities, authorization requirements, performance metrics, costs, etc. related to the local functionality. Pursuant to another illustration, availability of local functionality can be disseminated by way of a centralized and/or distributed database. At 1104, one or more of the notified, disparate mobile devices can be enabled to borrow the local functionality to carry out a task. Request(s) to use the local functionality can be received from the disparate mobile device(s). Further, authorization and/or authentication of the requesting, disparate mobile device(s) can be carried out.

Figure 12:
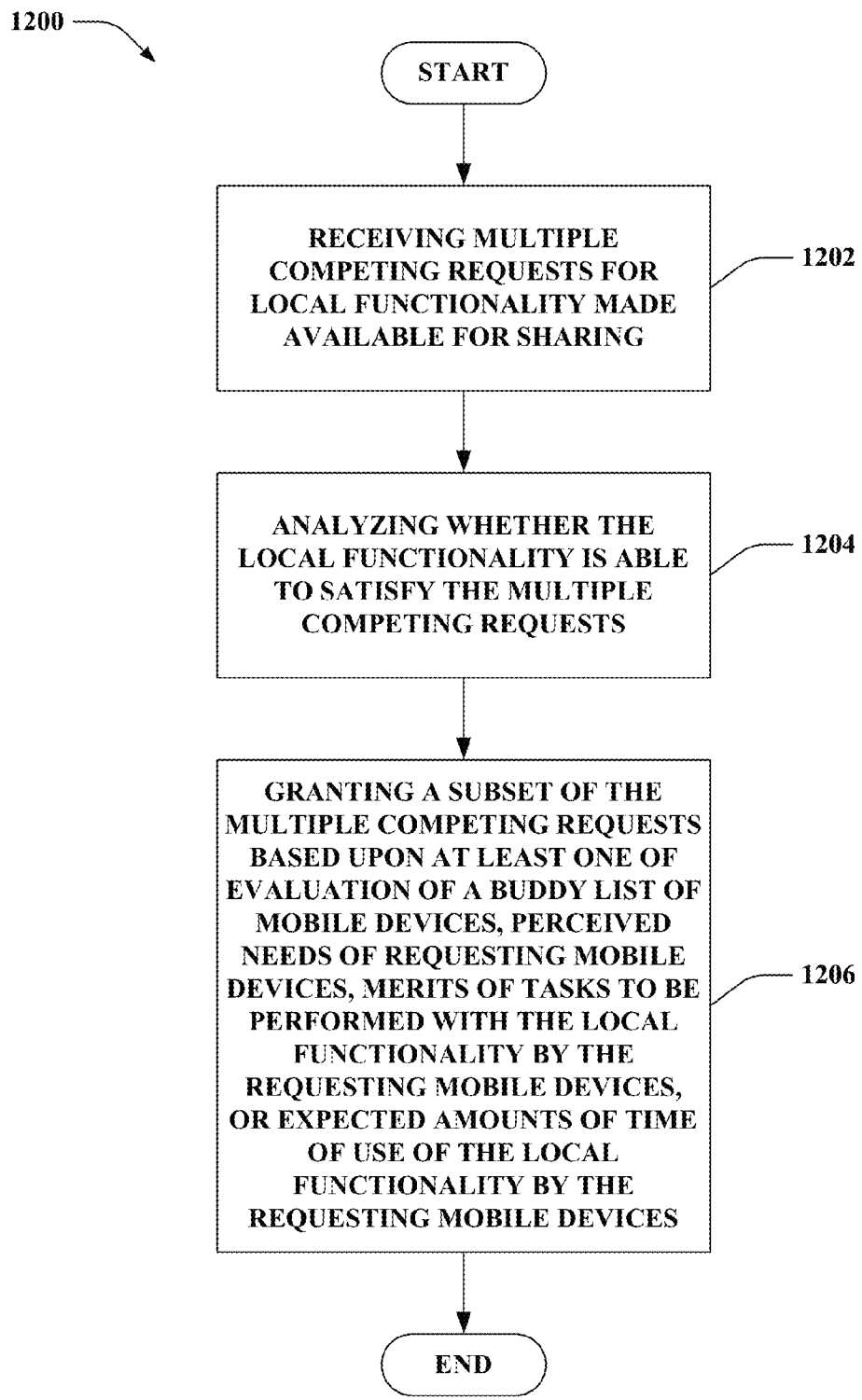
FIG. 12 is an illustration of an example methodology for enabling peer(s) to use available functionality of a local mobile device in a peer to peer network.

FIG. 12 illustrates an example methodology 1200 for enabling peer(s) to use available functionality of a local mobile device in a peer to peer network. At 1202, multiple competing requests for local functionality made available for sharing can be received. At 1204, an analysis can be effectuated to determine whether local functionality is able to satisfy the multiple competing requests. For example, two requests to use a local display can concurrently be received; yet, the display can be employed to render an output for only one of the requests at a particular time, and thus, granting of one of the requests would exhaust this resource (e.g., the local functionality cannot satisfy both of the competing requests). It is to be appreciated that the claimed subject matter is not limited to this example. At 1206, a subset of the multiple competing requests can be granted based upon at least one of evaluation of a buddy list of mobile devices, perceived needs of requesting mobile devices, merits of tasks to be performed with the local functionality by the requesting mobile devices, or expected amounts of time of use of the local functionality by the requesting mobile device.

Figure 13:
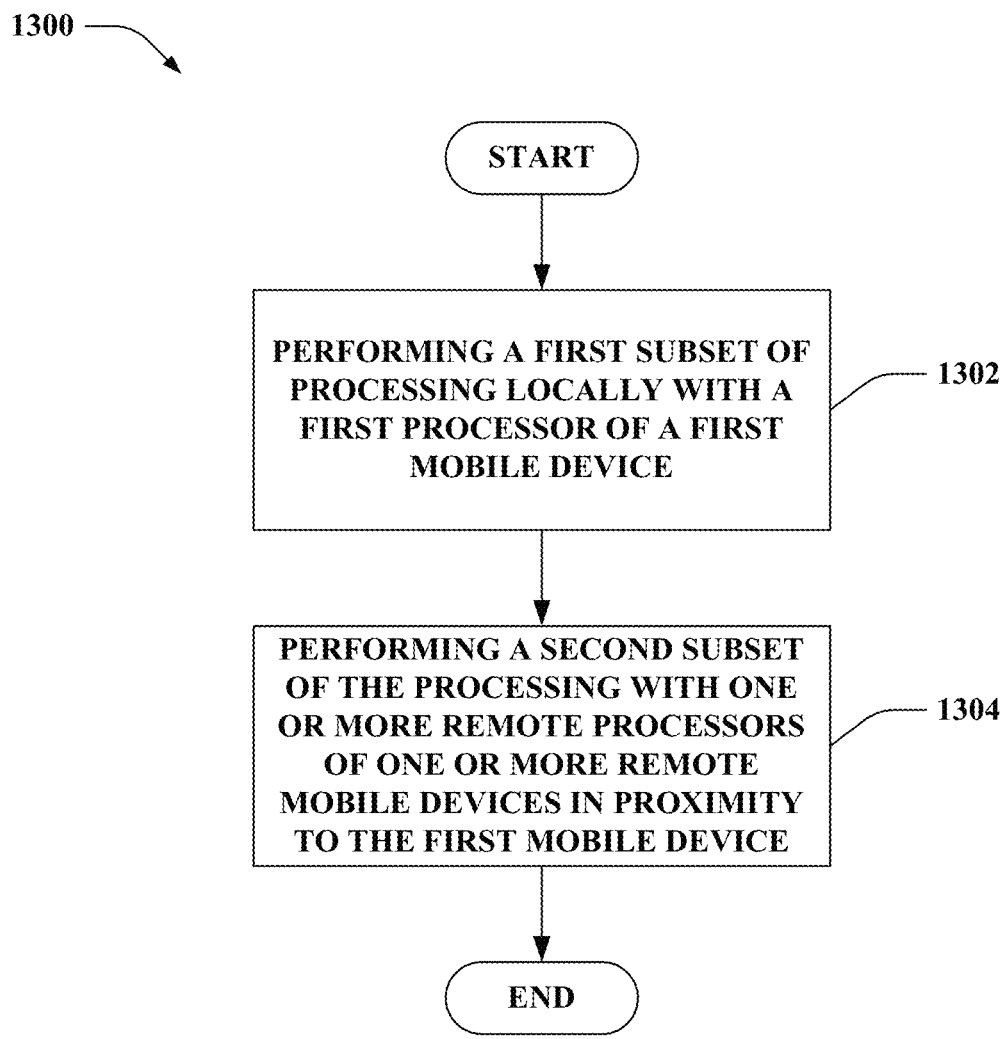
FIG. 13 is an illustration of an example methodology for effectuating hybrid processing with multiple shared processors of nearby mobile devices.

Turning to FIG. 13, illustrated is an example methodology 1300 for effectuating hybrid processing with multiple shared processors of nearby mobile devices. At 1302, a first subset of processing can be performed locally with a first processor of a first mobile device. At 1304, a second subset of the processing can be performed with one or more remote processors of one or more remote mobile devices in proximity to the first mobile device. Further, the processing can be segmented into the first subset to be performed locally and the second subset to be performed remotely. Moreover, additional remote processors can be added on an as needed basis to add extra processing power.

One of ordinary skill in the art can appreciate that the invention can be implemented in connection with any computer or other client or server device, which can be deployed as part of a computer network, or in a distributed computing environment, connected to any kind of data store. In this regard, the claimed subject matter pertains to any computer system or environment having any number of memory or storage units, and any number of applications and processes occurring across any number of storage units or volumes, which may be used in connection with wireless devices and wireless communications in accordance with the claimed subject matter. The present innovation may apply to an environment with server computers and client computers deployed in a network environment or a distributed computing environment, having remote or local storage. The present innovation may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the wireless devices and wireless communications of the invention.

Figure 14:
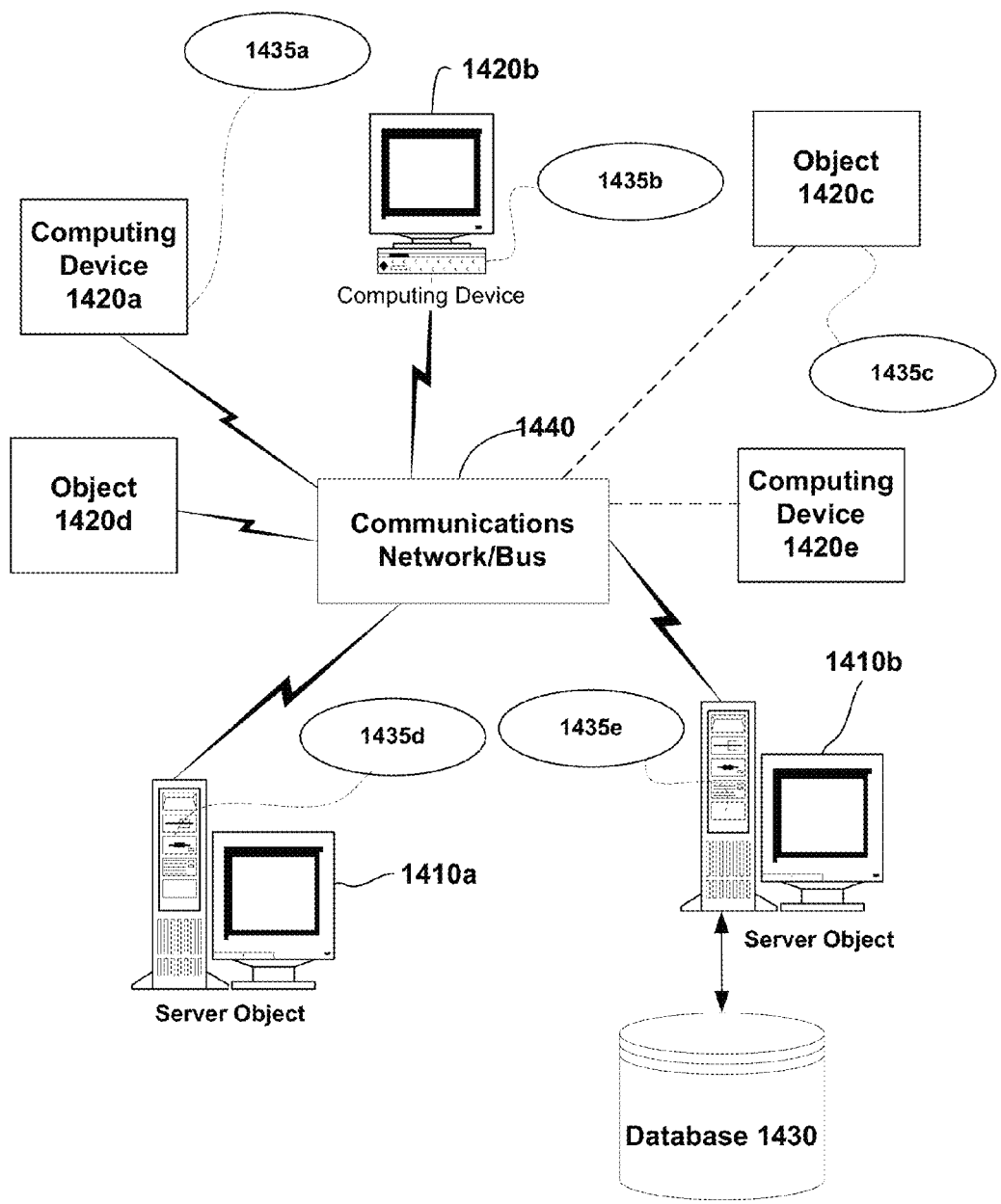
FIG. 14 is a block diagram representing an exemplary non-limiting networked environment in which the present invention may be implemented.

FIG. 14 provides a schematic diagram of an exemplary networked or distributed computing environment. The distributed computing environment comprises computing objects 1410a, 1410b, etc. and computing objects or devices 1420a, 1420b, 1420c, 1420d, 1420e, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 1440. This network may itself comprise other computing objects and computing devices that provide services to the system of FIG. 14, and may itself represent multiple interconnected networks. In accordance with an aspect of the invention, each object 1410a, 1410b, etc. or 1420a, 1420b, 1420c, 1420d, 1420e, etc. may contain an application that might make use of an API, or other object, software, firmware and/or hardware, suitable for use with the wireless devices and wireless communications in accordance with the invention.

It can also be appreciated that an object, such as 1420c, may be hosted on another computing device 1410a, 1410b, etc. or 1420a, 1420b, 1420c, 1420d, 1420e, etc. Thus, although the physical environment depicted may show the connected devices as computers, such illustration is merely exemplary and the physical environment may alternatively be depicted or described comprising various digital devices such as PDAs, televisions, HDTV, video projectors, MP3 players, etc., any of which may employ a variety of wired and wireless services, software objects such as interfaces, COM objects, and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to wireless devices and wireless communications according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, optical fiber and even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, any of the computing devices of the present invention may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 14, as an example, computers 1420*a*, 1420*b*, 1420*c*, 1420*d*, 1420*e*, etc. can be thought of as clients and computers 1410*a*, 1410*b*, etc. can be thought of as servers where servers 1410*a*, 1410*b*, etc. maintain the data that is then replicated to client computers 1420*a*, 1420*b*, 1420*c*, 1420*d*, 1420*e*, etc., although any computer can be considered a client, a server, or both, depending on the circumstances. Any of these computing devices may be processing data or requesting services or tasks that may implicate the wireless devices and wireless communications in accordance with the invention.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the wireless devices and wireless communications of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 14 illustrates an exemplary networked or distributed environment, with server(s) in communication with client computer (s) via a network/bus, in which the present invention may be employed. In more detail, a number of servers 1410*a*, 1410*b*, etc. are interconnected via a communications network/bus 1440, which may be a LAN, WAN, intranet, GSM network, the Internet, etc., with a number of client or remote computing devices 1420*a*, 1420*b*, 1420*c*, 1420*d*, 1420*e*, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to mobile.

In a network environment in which the communications network/bus 1440 is the Internet, for example, the servers 1410*a*, 1410*b*, etc. can be Web servers with which the clients 1420*a*, 1420*b*, 1420*c*, 1420*d*, 1420*e*, etc. communicate via any of a number of known protocols such as HTTP. Servers 1410*a*, 1410*b*, etc. may also serve as clients 1420*a*, 1420*b*, 1420*c*, 1420*d*, 1420*e*, etc., as may be characteristic of a distributed computing environment.

As mentioned, communications may be wired or wireless, or a combination, where appropriate. Client devices 1420*a*, 1420*b*, 1420*c*, 1420*d*, 1420*e*, etc. may or may not communicate via communications network/bus 1440, and may have independent communications associated therewith. For example, in the case of a TV or VCR, there may or may not be a networked aspect to the control thereof. Each client computer 1420*a*, 1420*b*, 1420*c*, 1420*d*, 1420*e*, etc. and server computer 1410*a*, 1410*b*, etc. may be equipped with various application program modules or objects 1435*a*, 1435*b*, 1435*c*, etc. and with connections or access to various types of storage elements or objects, across which files or data streams may be stored or to which portion(s) of files or data streams may be downloaded, transmitted or migrated. Any one or more of computers 1410*a*, 1410*b*, 1420*a*, 1420*b*, 1420*c*, 1420*d*, 1420*e*, etc. may be responsible for the maintenance and updating of a database 1430 or other storage element, such as a database or memory 1430 for storing data processed or saved according to the invention. Thus, the present invention can be utilized in a computer network environment having client computers 1420*a*, 1420*b*, 1420*c*, 1420*d*, 1420*e*, etc. that can access and interact with a computer network/bus 1440 and server computers 1410*a*, 1410*b*, etc. that may interact with client computers 1420*a*, 1420*b*, 1420*c*, 1420*d*, 1420*e*, etc. and other like devices, and databases 1430.

Figure 15:
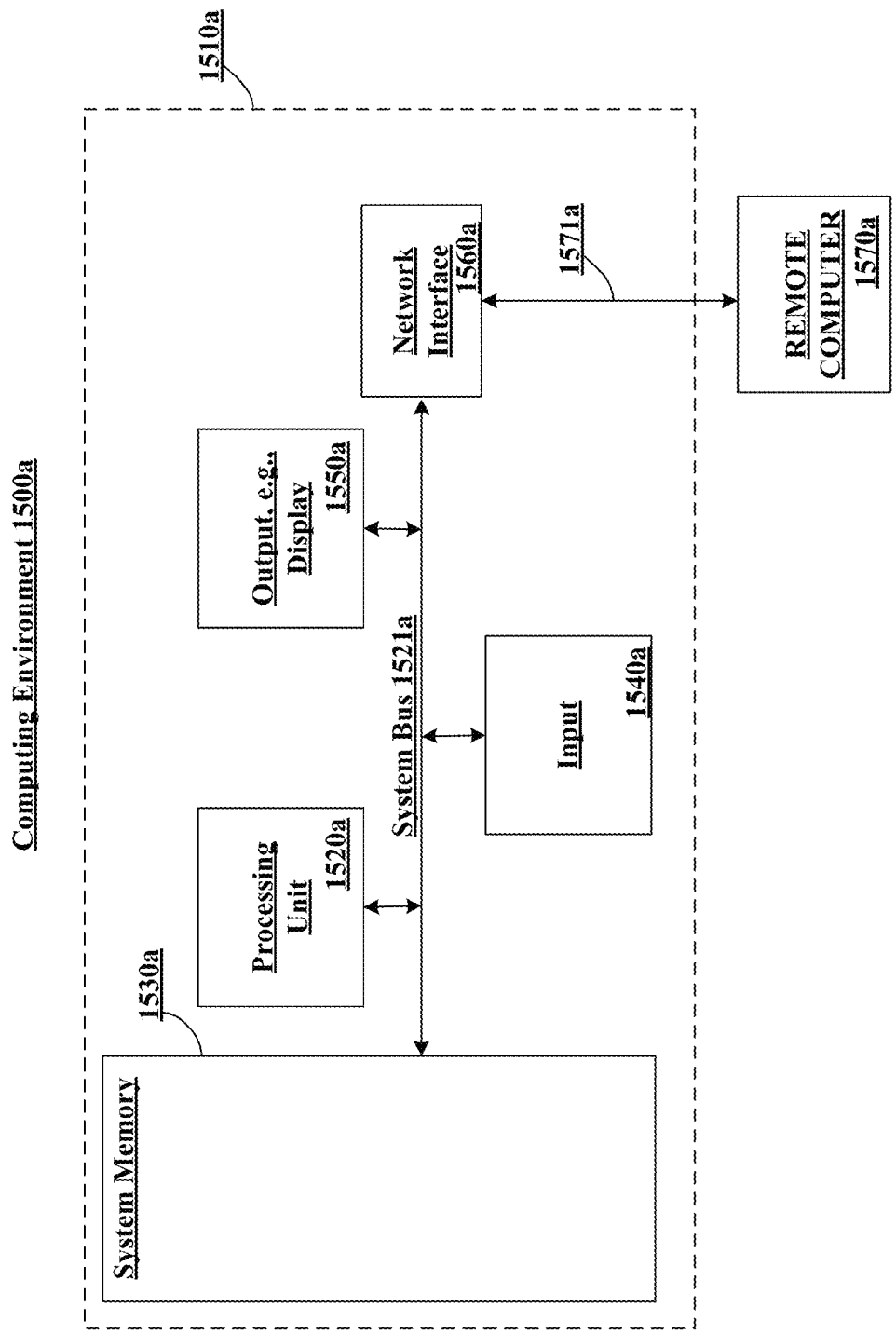
FIG. 15 is a block diagram representing an exemplary non-limiting computing system or operating environment in which the present invention may be implemented.

As mentioned, the invention applies to any device wherein it may be desirable to be mobile. It should be understood, therefore, that handheld, portable and other computing devices and computing objects of all kinds are contemplated for use in connection with the present invention, i.e., anywhere that a device may be wireless or otherwise receive, process or store data. Accordingly, the below general purpose remote computer described below in FIG. 15 is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 15 thus illustrates an example of a suitable computing system environment 1500*a* in which the invention may be implemented, although as made clear above, the computing system environment 1500*a* is only one example of a suitable computing environment for a media device and is not intended to suggest any limitation as to the scope of use or functionality of the invention. Neither should the computing environment 1500*a* be interpreted as having any dependency or requirement relating to any one or combination of components illustrated in the exemplary operating environment 1500*a*.

With reference to FIG. 15, an exemplary remote device for implementing the invention includes a general purpose computing device in the form of a computer 1510*a*. Components of computer 1510*a* may include, but are not limited to, a processing unit 1520*a*, a system memory 1530*a*, and a system bus 1521*a* that couples various system components including the system memory to the processing unit 1520*a*. The system bus 1521*a* may be any of several types of bus structures including a memory bus or memory controller, a peripheral bus, and a local bus using any of a variety of bus architectures.

Computer 1510a typically includes a variety of computer readable media. Computer readable media can be any available media that can be accessed by computer 1510a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1510a. Communication media typically embodies computer readable instructions, data structures, program modules or other data in a modulated data signal such as a carrier wave or other transport mechanism and includes any information delivery media.

The system memory 1530a may include computer storage media in the form of volatile and/or nonvolatile memory such as read only memory (ROM) and/or random access memory (RAM). A basic input/output system (BIOS), containing the basic routines that help to transfer information between elements within computer 1510a, such as during start-up, may be stored in memory 1530a. Memory 1530a typically also contains data and/or program modules that are immediately accessible to and/or presently being operated on by processing unit 1520a. By way of example, and not limitation, memory 1530a may also include an operating system, application programs, other program modules, and program data.

The computer 1510a may also include other removable/non-removable, volatile/nonvolatile computer storage media. For example, computer 1510a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1521a through a non-removable memory interface such as an interface, and a magnetic disk drive or optical disk drive is typically connected to the system bus 1521a by a removable memory interface, such as an interface.

A user may enter commands and information into the computer 1510a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 1520a through user input 1540a and associated interface (s) that are coupled to the system bus 1521a, but may be connected by other interface and bus structures, such as a parallel port, game port or a universal serial bus (USB). A graphics subsystem may also be connected to the system bus 1521a. A monitor or other type of display device is also connected to the system bus 1521a via an interface, such as output interface 1550a, which may in turn communicate with video memory. In addition to a monitor, computers may also include other peripheral output devices such as speakers and a printer, which may be connected through output interface 1550a.

The computer 1510a may operate in a networked or distributed environment using logical connections to one or more other remote computers, such as remote computer 1570a, which may in turn have media capabilities different from device 1510a. The remote computer 1570a may be a personal computer, a server, a router, a network PC, a peer device or other common network node, or any other remote media consumption or transmission device, and may include any or all of the elements described above relative to the computer 1510a. The logical connections depicted in FIG. 15 include a network 1571a, such local area network (LAN) or a wide area network (WAN), but may also include other networks/buses. Such networking environments are commonplace in homes, offices, enterprise-wide computer networks, intranets and the Internet.

When used in a LAN networking environment, the computer 1510a is connected to the LAN 1571a through a network interface or adapter. When used in a WAN networking environment, the computer 1510a typically includes a communications component, such as a modem, or other means for establishing communications over the WAN, such as the Internet. A communications component, such as a modem, which may be internal or external, may be connected to the system bus 1521a via the user input interface of input 1540a, or other appropriate mechanism. In a networked environment, program modules depicted relative to the computer 1510a, or portions thereof, may be stored in a remote memory storage device. It will be appreciated that the network connections shown and described are exemplary and other means of establishing a communications link between the computers may be used.

The above-described wireless devices and wireless communications may be applied to any network, however, the following description sets forth some exemplary telephony radio networks and non-limiting operating environments for wireless devices and wireless communications of the present invention. The below-described operating environments should be considered non-exhaustive, however, and thus the below-described network architecture merely shows one network architecture into which the present invention may be incorporated. One can appreciate, however, that the invention may be incorporated into any now existing or future alternative architectures for communication networks as well.

The global system for mobile communication ("GSM") is one of the most widely utilized wireless access systems in today's fast growing communication systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the invention may be applied independently of the method of data transport, and does not depend on any particular network architecture, or underlying protocols.

Figure 16:
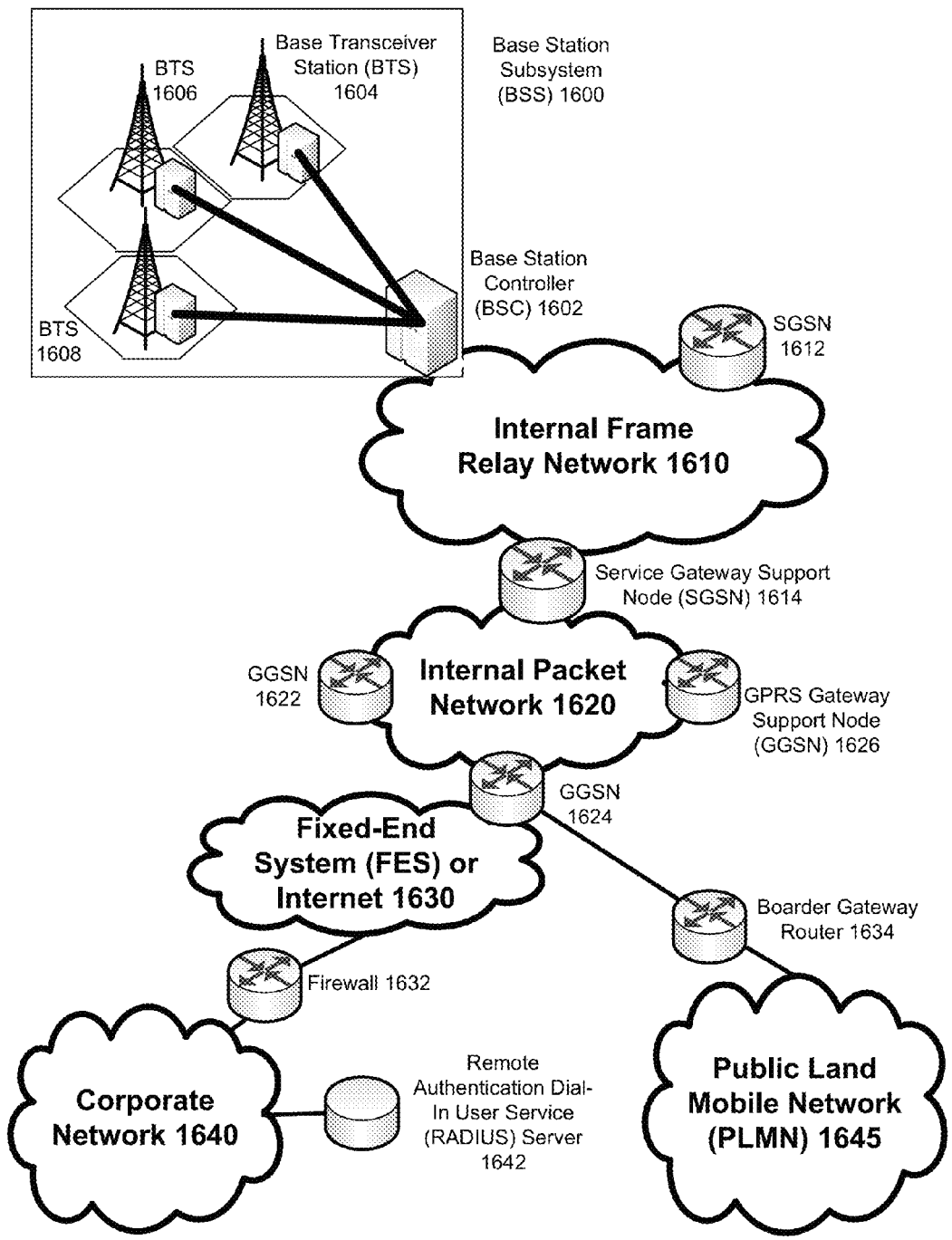
FIG. 16 illustrates an overview of a network environment suitable for service by embodiments of the invention.

FIG. 16 depicts an overall block diagram of an exemplary packet-based mobile cellular network environment, such as a GPRS network, in which the invention may be practiced. In such an environment, there are a plurality of Base Station Subsystems ("BSS") 1600 (only one is shown), each of which comprises a Base Station Controller ("BSC") 1602 serving a plurality of Base Transceiver Stations ("BTS") such as BTSs 1604, 1606, and 1608. BTSs 1604, 1606, 1608, etc. are the access points where users of packet-based mobile devices become connected to the wireless network. In exemplary fashion, the packet traffic originating from user devices is transported over the air interface to a BTS 1608, and from the BTS 1608 to the BSC 1602. Base station subsystems, such as BSS 1600, are a part of internal frame relay network 1610 that may include Service GPRS Support Nodes ("SGSN") such as SGSN 1612 and 1614. Each SGSN is in turn connected to an internal packet network 1620 through which a SGSN 1612, 1614, etc. can route data packets to and from a plurality of gateway GPRS support nodes (GGSN) 1622, 1624, 1626, etc. As illustrated, SGSN 1614 and GGSNs 1622, 1624, and 1626 are part of internal packet network 1620. Gateway GPRS serving nodes 1622, 1624 and 1626 mainly provide an interface to external Internet Protocol ("IP") networks such as Public Land Mobile Network ("PLMN") 1645, corporate intranets 1640, or Fixed-End System ("FES") or the public Internet 1630. As illustrated, subscriber corporate network 1640 may be connected to GGSN 1624 via firewall 1632; and PLMN 1645 is connected to GGSN 1624 via boarder gateway router 1634. The Remote Authentication Dial-In User Service ("RADIUS") server 1642 may be used for caller authentication when a user of a mobile cellular device calls corporate network 1640.

Generally, there can be four different cell sizes in a GSM network—macro, micro, pico and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

Thus, network elements that may implicate the functionality of the optimization algorithms and processes in accordance with the invention may include but are not limited to Gateway GPRS Support Node tables, Fixed End System router tables, firewall systems, VPN tunnels, and any number of other network elements as required by the particular digital network.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Various implementations of the invention described herein may have aspects that are wholly in hardware, partly in hardware and partly in software, as well as in software. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The terms "article of manufacture", "computer program product" or similar terms, where used herein, are intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), Blue ray DVD, . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components, e.g., according to a hierarchical arrangement. Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers, . . . ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom.

While exemplary embodiments refer to utilizing the present invention in the context of particular programming language constructs, specifications or standards, the invention is not so limited, but rather may be implemented in any language to perform the optimization algorithms and processes. Still further, the present invention may be implemented in or across a plurality of processing chips or devices, and storage may similarly be effected across a plurality of devices.

Therefore, the present invention should not be limited to any single embodiment, but rather should be construed in breadth and scope in accordance with the appended claims.

What is claimed is:

1. A mobile device, comprising:
   a memory to store instructions; and
   a processor, communicatively coupled to the memory, that executes or facilitates execution of the instructions to at least:
   determine whether one or more functional components of the mobile device has transitioned from a functional state to a disabled state due to limited processing power provided by the processor;
   in response to a determination that the one or more functional components of the processor has transitioned from the functional state to the disabled state due to limited processing power provided by the processor, search for a remote processor of a remote mobile device having second processing power available for share by a disparate mobile device to supplement operation of the processor to perform a task;
   determine a network path from the mobile device to the disparate mobile device via at least one intermediate mobile device that facilitates, via the intermediate device, data exchange between the mobile device and the disparate mobile device; and
   access the remote processor via the network path and supplement the functional component of the processor using functionality of the remote mobile device to facilitate performance of the task.

2. The mobile device of claim 1, wherein the processor further executes or facilitates the execution of the instructions to identify a set of remote functional components, including the remote processor, available for share and to enable the mobile device to select one of the remote functional components from the set of remote functional components.

3. The mobile device of claim 1, wherein the processor further executes or facilitates the execution of the instructions to determine that the processor has transitioned from the functional state to at least one of an unavailable state, an inactivated state, or an inefficient state.

4. The mobile device of claim 1, wherein the processor further executes or facilitates the execution of the instructions to identify, based on analysis of the task, at least one first functional component of the mobile device to be used to accomplish the task and at least one second functional component of the disparate mobile device to be used to accomplish the task.

5. The mobile device of claim 1, wherein the processor further executes or facilitates the execution of the instructions to identify an available functional component hosted by the disparate mobile device and available to be shared with the mobile device.

6. The mobile device of claim 1, wherein the processor further executes or facilitates the execution of the instructions to allow the disparate mobile device to use an available functional component of the mobile device.

7. The mobile device of claim 6, wherein the processor further executes or facilitates the execution of the instructions to at least one of authorize or authenticate the disparate mobile device in response to selection by the disparate mobile device of the available functional component of the mobile device.

8. The mobile device of claim 7, wherein the processor further executes or facilitates the execution of the instructions to allocate use of the available functional component among multiple disparate mobile devices in response to reception of concurrent or substantially concurrent requests for use of the available functional component from the multiple disparate mobile devices.

9. The mobile device of claim 1, wherein the processor further executes or facilitates the execution of the instructions to generate debit information that debits an account in response to usage of the remote processor by the mobile device.

10. The mobile device of claim 1, wherein the mobile device is configured to act as a node within a mesh network of devices that share functional components according to a peer-to-peer protocol.

11. A method, comprising:
    in response to determining that one or more functional components of a mobile device has transitioned from a functional state to a disabled state due to a limited first processing power provided by a first processor:
    searching for a second processor of a remote mobile device having second processing power made available for sharing by a second mobile device to supplement operation of the first processor to perform a task;

determining a network path from the first mobile device to the second mobile device through an intermediate mobile device;

exchanging data between the first mobile device and the second mobile device via the intermediate mobile device; and supplementing the one or more functional components with the second processing power of the second mobile device via the network path in connection with performance of the task.

12. The method of claim 11, further comprising:

identifying a set of remote functional components, including the second processor, available for share by the second mobile device; and receive selection input at the first mobile device that selects a remote functional component from the set of remote functional components.

13. The method of claim 11, further comprising providing an available functional component of the first mobile device for use by the second mobile device over the network path or a different network path.

14. A system comprising:

means for determining that one or more functional components of a mobile device have transitioned from an operational state to a non-operational state due to a limited amount of available processing power of a processor;

means for searching, in response to the determining, for a remote processor of a remote mobile device, wherein the remote processor is made available for share by the remote mobile device;

means for identifying at least one intermediate mobile device in a network path from the mobile device to the remote mobile device; and means for supplementing performance of the one or more functional components with functionality of the remote mobile device by communication with the remote mobile device via the intermediate mobile device.

15. A non-transitory computer-readable medium having stored thereon instructions that, in response to execution, cause a mobile device comprising a processor to perform operations, comprising:

in response to determining that one or more functional components of the mobile device has transitioned from an operational state to a non-operational state due to a limited amount of available first processing power of the processor, searching for a second mobile device comprising a remote processor with available second processing power made sharable by the second mobile device;

determining a network path from the first mobile device to the second mobile device through an intermediate mobile device; and accessing the remote processor via the intermediate mobile device to supplement operation of the one or more functional components using the remote mobile device to perform a task.

16. The method of claim 11, further comprising searching for the second processor in response to a determination that the first processor has transitioned from the functional state to at least one of an unavailable state, an inactivated state, or an inefficient state.

17. The system of claim 14, wherein the means for determining comprises means for determining that a state of the processor has changed from the operational state to at least one of a disabled state, an unavailable state, an inactivated state, or an inefficient state.

18. The non-transitory computer-readable medium of claim 15, wherein the operations further comprise selecting a set of functional components for performance of the task, wherein the set of functional components comprise at least one first functional component of the first mobile device and a second functional component of the second mobile device.

19. The non-transitory computer-readable medium of claim 15, wherein the operations further comprise allowing the second mobile device or another mobile device to access an available functional component of the first mobile device.

20. The non-transitory computer-readable medium of claim 15, wherein the operations further comprise authenticating the second mobile device or the other mobile device in response to receiving a request from the second mobile device or the other mobile device to access the available functional component.

* * * * *